(12) United States Patent
Dahm et al.

(10) Patent No.: US 7,456,024 B2
(45) Date of Patent: Nov. 25, 2008

(54) METHOD AND DEVICE FOR PREPARING A SAMPLE OF BIOLOGICAL ORIGIN IN ORDER TO DETERMINE AT LEAST ONE CONSTITUENT CONTAINED THEREIN

(75) Inventors: Michael Dahm, München (DE); Robert Phelps, Karlsfeld (DE)

(73) Assignee: Hexal Pharma GmbH, Vienna (AT)

( * ) Notice: Subject to any disclaimer, the term of this patent is extended or adjusted under 35 U.S.C. 154(b) by 831 days.

(21) Appl. No.: 10/487,791

(22) PCT Filed: Aug. 29, 2002

(86) PCT No.: PCT/AT02/00255

§ 371 (c)(1),
(2), (4) Date: Aug. 30, 2004

(87) PCT Pub. No.: WO03/019131

PCT Pub. Date: Mar. 6, 2003

(65) Prior Publication Data
US 2005/0014273 A1    Jan. 20, 2005

(30) Foreign Application Priority Data
Aug. 29, 2001    (AT) .............................. A 1364/2001

(51) Int. Cl.
    *G01N 21/00* (2006.01)
(52) U.S. Cl. .................................................. 436/164
(58) Field of Classification Search ............... 436/164
    See application file for complete search history.

(56) References Cited

U.S. PATENT DOCUMENTS 5,501,841 A    3/1996    Lee et al.
5,536,262 A    7/1996    Velasquez (Continued)

FOREIGN PATENT DOCUMENTS

DE    38 17 101 A1    11/1989

(Continued)

OTHER PUBLICATIONS

International Search Report.

(Continued)

*Primary Examiner*—Walter D. Griffin
*Assistant Examiner*—Bobby Ramdhanie
(74) *Attorney, Agent, or Firm*—Collard & Roe, P.C.

(57) ABSTRACT

The invention relates to a method of preparing an original sample (3) of biological origin with a view to detecting at least one component contained in it, whereby the original sample (3) is enclosed in a first container (1) and at least a part of this original sample (3) is transferred from the first container (1) into at least one reaction container, a reagent (9) or reagent mixture being placed beforehand in at least one of the reaction containers in order to prepare the original sample (3) and the component to be detected. In order to transfer at least a part of the original sample (3), two respective containers (1, 6) are connected to one another to form a closed, airtight system at least until at least the component(s) to be detected has (have) been rendered stable by reacting it (them) with the reagent (9) or reagent mixture at room temperature.

6 Claims, 14 Drawing Sheets

U.S. PATENT DOCUMENTS

| | | |
|---|---|---|
| 5,604,320 A | 2/1997 | Boyd |
| 5,653,686 A | 8/1997 | Coulter et al. |
| 5,743,312 A | 4/1998 | Pfeifer et al. |
| 5,833,860 A | 11/1998 | Kopaciewicz et al. |
| 6,720,417 B1 | 4/2004 | Walter |
| 6,776,959 B1 | 8/2004 | Helftenbein |

FOREIGN PATENT DOCUMENTS

| | | |
|---|---|---|
| DE | 3817101 | 11/1989 |
| DE | 40 20 442 | 1/1992 |
| DE | 195 13 666 | 11/1996 |
| EP | 0 225 861 | 6/1987 |
| EP | 0 592 689 A1 | 4/1994 |
| EP | 0592689 | 4/1994 |
| EP | 0 818 542 A1 | 1/1998 |
| EP | 0818542 | 1/1998 |
| JP | 7 035 656 | 2/1995 |
| JP | 10 179 555 | 7/1998 |
| WO | WO 9310433 | 5/1993 |
| WO | WO 95 16395 | 6/1995 |
| WO | WO 97 05248 | 2/1997 |
| WO | WO 97/05248 A | 2/1997 |
| WO | WO 98 17397 | 4/1998 |
| WO | WO 98/32877 A | 7/1998 |
| WO | WO 9832877 | 7/1998 |
| WO | WO 00 09746 | 2/2000 |
| WO | WO 00/09746 A | 2/2000 |
| WO | WO 00 46585 | 8/2000 |
| WO | WO 01 26550 | 4/2001 |
| WO | WO 01 70403 | 9/2001 |

OTHER PUBLICATIONS

Chomczynski, P. et al, "Single-step Method of RNA Isolation by Acid Guanidinium Thiocyanate-Phenol-Chloroform Extraction," Analytical Biochemistry, 1987, vol. 162, No. 1. XP 000608462 (ISR).

Chomczynski P et al: "*Single-Step Method of RNA Isolation by Acid Guanidinium Thiocyanate-Phenol-Chloroform Extraction*" Analytical Biochemistry, Orlando, FL, US, vol. 162, No. 1, Apr. 1, 1987 pp. 156-159 XP 000608462.

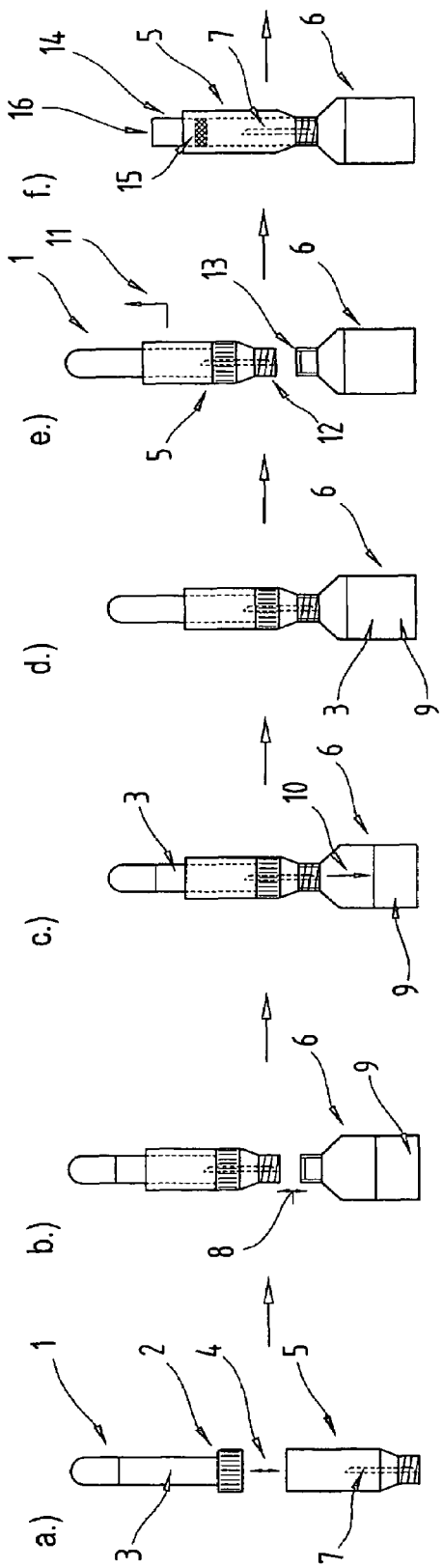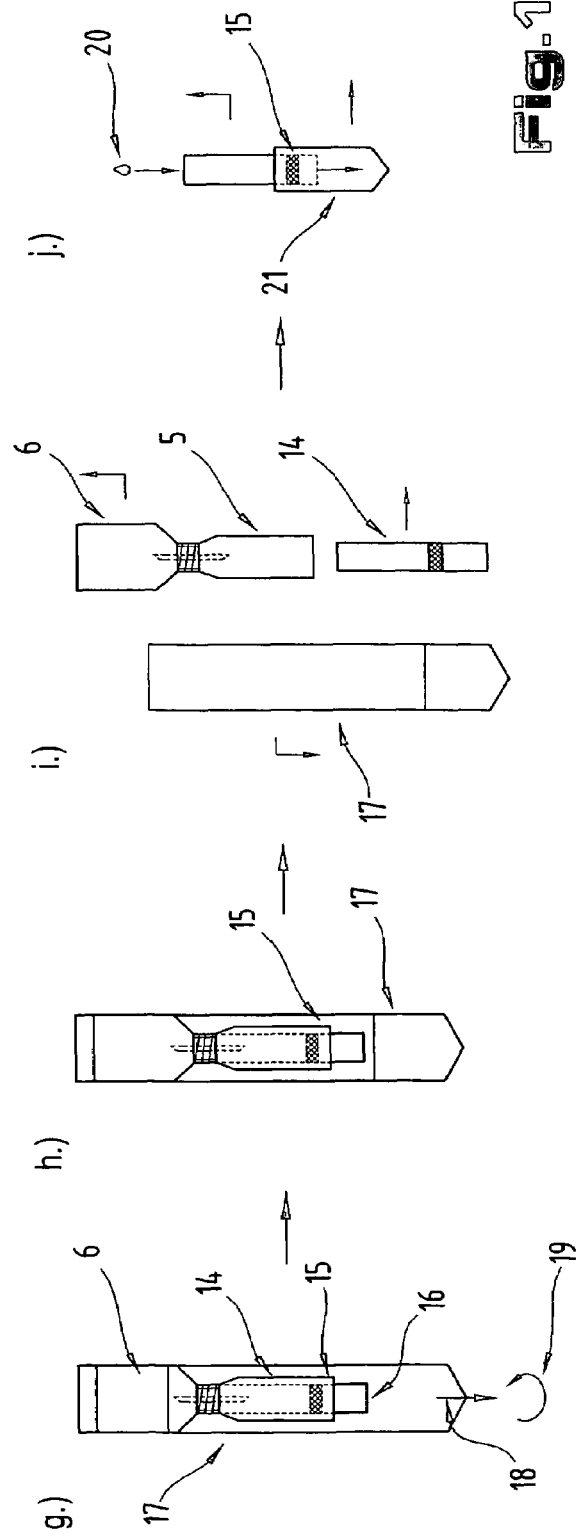
Fig. 1

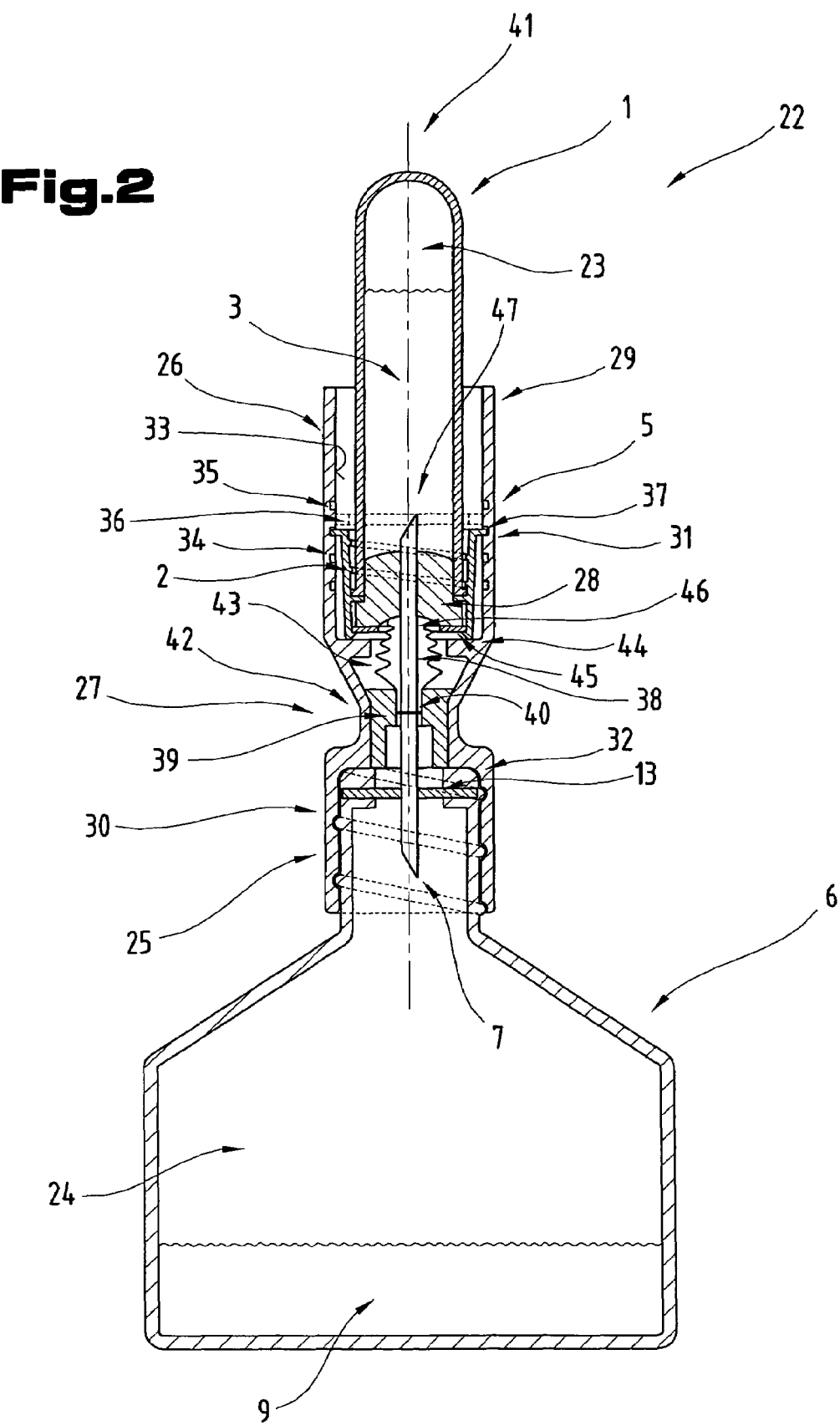

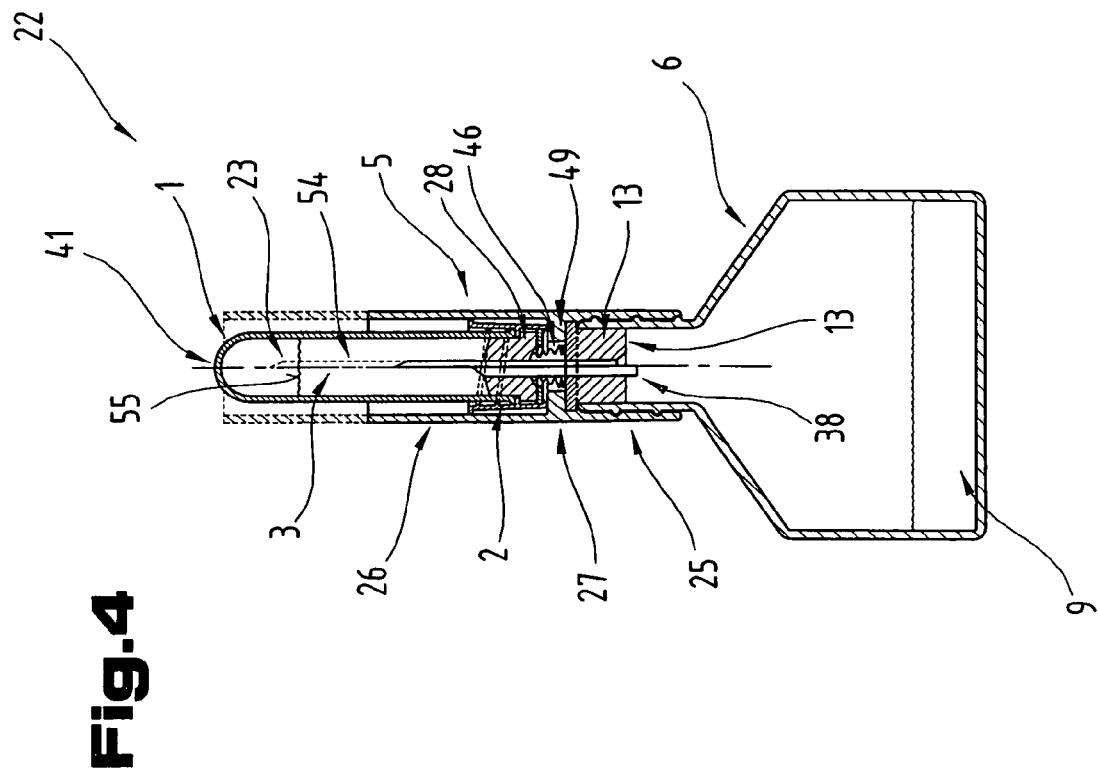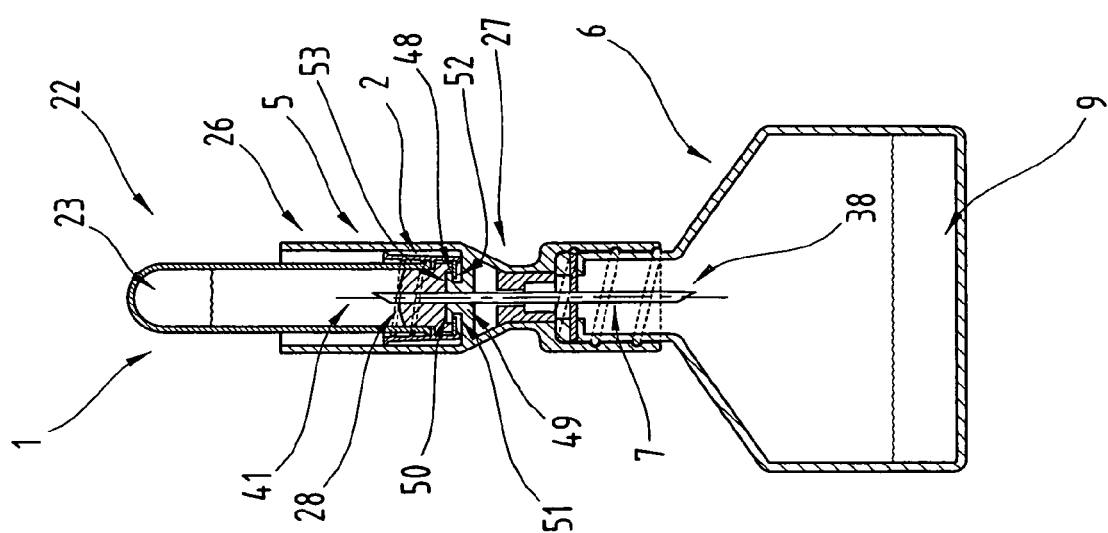

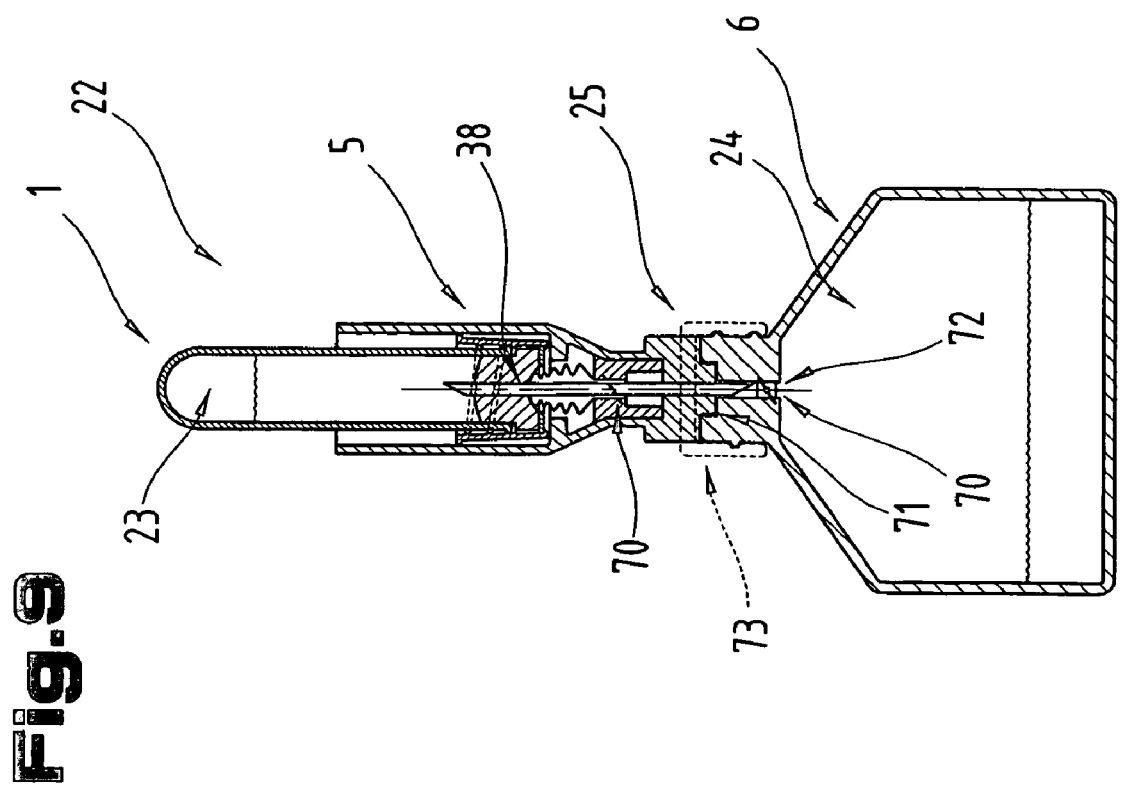

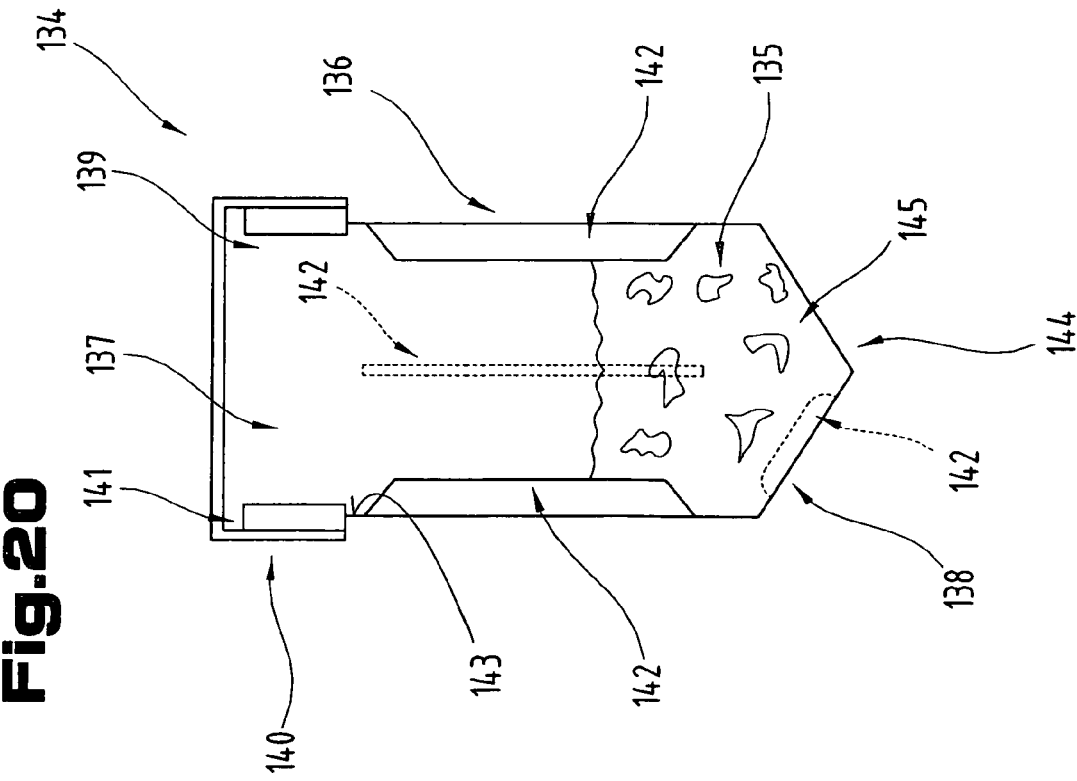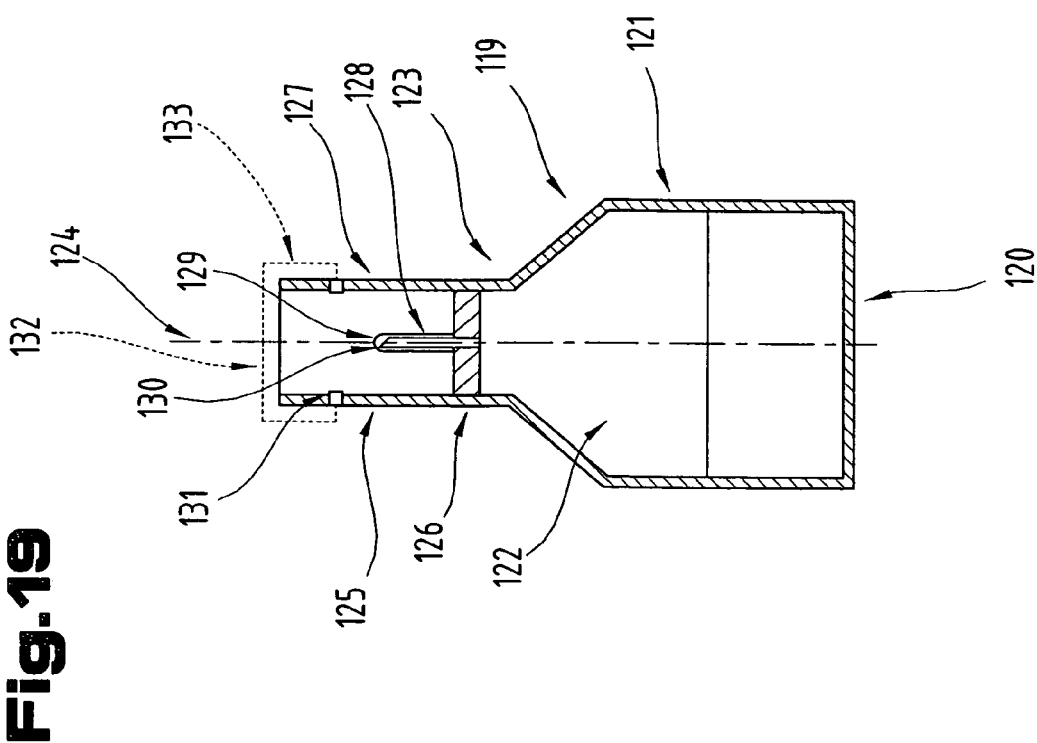

METHOD AND DEVICE FOR PREPARING A SAMPLE OF BIOLOGICAL ORIGIN IN ORDER TO DETERMINE AT LEAST ONE CONSTITUENT CONTAINED THEREIN

CROSS REFERENCE TO RELATED APPLICATIONS

Applicants claim priority under 35 U.S.C. §119 of AUSTRIAN Application No. A 1364/2001 filed on Aug. 29, 2001. Applicants also claim priority under 35 U.S.C. §365 of PCT/ATO2/00255 filed on Aug. 29, 2002. The international application under PCT article 21(2)was not published in English.

The invention relates to a method of preparing an original sample of biological origin with a view to detecting at least one component contained in it, a device for establishing a closed, air-tight flow connection between two containers, a container with a device for establishing a closed, air-tight connection to another container, a device for cutting up a sample of biological origin into smaller pieces, an analysis kit and a buffer. The invention further relates to the use of the device of the container or analysis kit for analysing samples of biological origin.

Molecular analysis, i.e. providing evidence of nucleic acids, is becoming increasingly important in clinical diagnosis, i.e. as a means of determining genetic defects or in solving crime, to name but a few examples. The methods of choice in detecting DNA these days are the polymerase chain reaction (PCR) or reverse transcriptase polymerase chain reaction (RT-PCR), by means of which specific nucleic acids can be detected from even the smallest of samples.

A vessel used for taking a blood sample which simultaneously stabilises nucleic acid is known from patent specification WO 00/09746 A. The effect of cellular and extracellular nucleases normally remains under physiological control, as long as the cells are in their normal environment within the body. When a blood sample is taken, however, changes occur in the nucleic acids contained in the cells to a greater or lesser degree. The cells contain nuclease enzymes, which destroy nucleic acids. In order to prevent this breakdown, the vessel disclosed in patent specification WO 00/09746 A contains an aqueous solution of a guanidinium salt with a buffer substance, a reducing agent and/or a detergent, causing the blood to be lysed and the nucleases to be released at the instant the blood sample is taken. The stabilised blood can then be analysed for nucleic acids using standard analysis kits. The disadvantage of this system is that, although the blood sample tube is evacuated, there is no way of guaranteeing one hundred percent that some of this mixture will not flow back into the blood circulation of the patient and lead to lysis, i.e. destroy cells in the living body.

Another approach known from the prior art is to operate the lysing process in a separate vessel, which means that the blood has to be transferred to it. To date, this has been done by opening the blood sample tube and emptying the contents into the vessel, which leaves medical personnel open to the potential risk of viruses, e.g. HIV, HCV.

In recent years, there has been a growing interest in so-called prognosis models for detecting and monitoring minimal residual diseases, e.g. for classifying the stage of a tumour by determining the quantity of tumour cells circulating in the blood. One such system is available under the trade name "OncoQuick®". With this system, the cells contained in the blood are separated according to their specific density in a centrifugation process. Due to the specific properties of a separation medium and the fact that a separator plate is provided in the centrifuge tube, blood cells such as erythrocytes and leukocytes settle in the bottom compartment of the tube, thereby forcing the separating medium into the top compartment. The cell fraction with the lower density, which also contains the tumour cells, collects at the intermediate phase in the top compartment between plasma and separating medium, from where it can be removed. After further preparation, the tumour cells can be used in conjunction with known methods of analysing the tumour cells.

Consequently, there exist in the prior art various different systems and aids which may be used for molecular diagnosis. The disadvantage which exists is that the individual systems can not be combined with one another or can be so only with a greater or lesser degree of difficulty, which ultimately means that the end user has to resort to various ways and means. No sealed and reliable system exists, at least for the part of the analysis during which there is a risk of infection due to contaminated sample material.

Systems of various types are known from the prior art which allow two containers to be connected to one another so that fluid samples can be transferred between them. Patent specification DE 38 17 101 A1, for example, discloses a device for transferring a fluid from one container to a second container in which a solvent is enclosed. This device consists of a hollow body with two orifices disposed opposite one another in which container connector pieces are fitted. A cannula is fitted between these orifices in such a way that it is able to slide in the longitudinal direction against a stop which it can then slide past, and the resistance needed to overcome the latter is higher than the piercing resistance of the seal of the first container inserted in the direction in which the cannula is inserted, so that once the cannula has overcome this resistance it extends through the seal of the second container inserted in the hollow body. The system enables a defined sequence to be effected as the seal is pierced.

Patent specification U.S. Pat. No. 5,653,686 A describes a cylindrical device for transferring blood from a first blood sample tube in which it is contained to a second tube. The device has two regions for accommodating sealed blood samples tubes, between which a cannula for transferring the blood and a venting needle are disposed. The venting needle opens into a venting chamber in the device, which prevents the user from being placed at risk of coming into contact with infectious blood due to the formation of an aerosol during pressure compensation as the first tube is being fitted. The seal of the first tube is not pierced by the cannula until the pressure has been compensated. Because it is evacuated, it is only then that the second tube can be inserted in the second region intended for fitting the device, thereby enabling a flow connection to be established between the tubes. With the system described in this US-A patent, a specific volume of blood needed for a reaction to analyse antibodies is transferred from the blood sample tube to the second evacuated tube. The vacuum is such that a specific quantity of blood adapted to a specific quantity of monoclonal antibody contained in the tube is transferred.

Patent specification DE 195 13 666 C1 discloses a device for placing a first liquid component and a second solid or liquid component in contact with one another under sterile conditions by means of a vacuum pressure. The first liquid component is transferred from a container, which container is under vacuum pressure, with the aid of a two-step mechanism, whereby the seal of the first container enclosing the liquid component is firstly pierced and then a cannula holder incorporating the cannula is pushed by means of this container towards the container in which the solid or liquid component is enclosed so that the cannula pierces the seal. The cannula holder accommodating the cannula is a plate-shaped body oriented perpendicular to the longitudinal direction of the hollow body accommodating the two containers and is joined to the internal wall of the hollow body by means of retaining webs, and the retaining webs can be torn off by applying a manual force which is greater than the penetration force of the cannula as it pierces the seal of the container which is opened first.

Patent specification EP 0 592 689 A1 also discloses a cylindrically shaped device for transferring a liquid between two containers, one of which contains a medicament which has to be mixed with the liquid, in which a cannula is fitted so that it is able to slide along the cylinder axis. When the container with the medicament is pushed in the direction of the second container, the cannula is pushed in the same direction, piercing the two container seals. With this device, the container holding the medicament and the liquid-transferring device form a single unit, which can be removed from the first container in the form of an infusion bag. This device can not be used more than once.

What these devices for transferring liquids and their associated systems have in common is that the essential feature is the timing with which the individual container seals are pierced, based in particular on a specific sequence by which these seals are pierced.

If cells are present in the form of individual cells in suspension, e.g. in cell culture, blood and other bodily fluids, they can be broken down directly by chemical means. Tissue, on the other hand, consists of cell strips with differently joined connective tissue which have to be mechanically homogenised before further processing. Two standard methods are used for homogenisation purposes: 1. frozen tissue is firstly pounded down in liquid nitrogen and the resultant powder transferred to appropriate buffer systems or 2. the pieces of tissue are broken down in a special buffer system in a mixer. The buffer system is needed for the chemical breakdown of the cells and also to preserve the target substances contained in it, i.e. proteins and nucleic acids, which are then stored in the chilled or frozen state for long or very long periods or can be processed immediately.

Since the polymerase chain reaction (PCR) is able to show up even the slightest traces of specific nucleic acids, this molecular biological technique is being used on a more frequent basis for all types of medicinal research: peripheral blood is the target substrate of choice. Molecular tissue diagnosis is being conducted on an experimental basis only at present. Examples of this are the analysis of micro-organisms such as microbial bacteria or borelia in skin lesions or molecular tumours and metastasis analysis in lymph nodes or tissue using tissue-specific or tumour-specific gene expressions of tumour cells to assist evaluation of histological issues. This includes, for example, the analysis of tyrosinasogens in the case of malignant melanoma or prostate-specific antigens in the case of Prostata-Ca. An example of this in clinical practice is the sampling of lymph nodes in tumour patients, taken from lymph node stations closest to or close to the tumorous tissue, which are then analysed in a series of histological sections under the microscope for colonisation. Since only a few sections can be tested for each piece of tissue, the fact that no metastases can be detected under the microscope does not mean that this is absolutely reliable proof that there are no microfiliae in the tissue sample being tested as a whole. Dividing the lymph node tissue in order to conduct histological tests on the one hand and molecular biological tests on the other will help the clinician make a more reliable prognosis or determine the spread of the disease in the case of certain cancers and will contribute to the decision as to what treatment is needed.

The fact that clinical-molecular tissue diagnosis is generally only at an experimental stage is attributable to the fact that obtaining tissue samples for molecular analysis is a relatively complex and involved process, amongst other things. If the tissue to be examined is obtained in the operating theatre, it needs to be shock-frozen in liquid nitrogen as quickly as possible, placed in a pre-cooled container and immediately deep-frozen at $-20°$ C. or, as happens at the moment at $-70°$ C. However, this means that clinics and practices must have a good organisational system in the operating theatre itself and have the appropriate infrastructure to hand, such as liquid nitrogen in special containers, adequate cooling facilities, extra time, extra staff, special premises and, because of the toxicity of conventional homogenisation buffers and the fact that the samples are potentially infectious, additional safety measures. In many clinics, even in university clinics, not all the requisite conditions are or can be fulfilled. Consequently, in spite of the advantages, molecular tissue diagnosis is not conducted in many cases, except on the initiative of specific individuals. Taking tissue samples and preserving them is equally fraught with difficulty in regions with a poor infrastructure in the molecular biology sector, such as developing countries, for example.

The objective of the invention is to offer a possibility, i.e. a method and devices, by means of which the risk of infection to users of such devices can be reduced to a minimum when preparing and analysing samples of biological origin. Another part-objective of the invention is to make an analysis kit available with these devices, which will simplify the work of the user. Yet another part-objective of the invention is to reduce contamination of the ambient environment by samples of biological origin once the samples have been obtained.

These objectives are achieved by the invention, independently in each case, as a result of the features specified. The resultant advantage is that the user of the method working with the original sample of biological origin does not come into contact with the sample from the time it is first taken until the original sample or a piece of this original sample or a component contained in it which has to be analysed has been rendered stable by reacting it with a reagent or reagent mixtures at room temperature, which means, for example, that nucleic acids can no longer be broken down by RNAses. The reagents used to prepare nucleic acids, e.g. lysing buffers containing a guanidinium salt, can now be stored in a separate container as a result of the method so that contact with the patient when taking the blood sample is no longer possible under normal circumstances. This is the case in particular because containers prepared in this manner, for example in the form of a kit for analysing blood samples, are not used by the attendant physician but by the laboratory analysing the blood samples. The fact of splitting the act of taking the sample and preparation of the sample also means that, unlike the system disclosed in patent specification WO 00/09746 A for example, samples are "frozen" in their original state, so that only a part of these samples is used for analysis purposes and unaltered control samples can be held available for subsequent confirmation and control. Since the sample or parts of the sample are transferred from one container to another container via a sealed, airtight system, however, not only are staff prevented from coming into direct contact with the sample and then with the reagents used to prepare the sample, the sample is also substantially protected against any contamination which might otherwise occur if the sample were transferred between vessels with a pipette. This is a positive factor in terms of the quality of the analysis results and in particular the reliability of the results. The fact that a sealed, airtight system is provided between the two containers means that processing of the original sample can be interrupted at any time without any risk of the sample being exposed to oxidation due to oxygen in the ambient air. This is the case in particular if both containers are evacuated prior to use.

The method can be implemented using a device in accordance with one embodiment on the one hand, or alternatively using a container in accordance with another embodiment, on the other. The advantage of this is that the device can used to establish a flow connection between the two containers remains attached to the first container after the original sample has been transferred from the first into the second container so that, in a single operating step, it can be taken apart from the second container, which may specifically contain a preparatory reagent or reagent mixture, and disposed of. Another particular advantage is that if the second container is fitted with a self-closing septum, extra protective caps for the means used to pierce this septum can be dispensed with, thereby avoiding any risk of such protective caps not fitting in a tight seal around this piercing means. The fact that the piercing means points downwards as a rule when the first container and the device proposed by the invention attached to it is removed, reduces the risk of injury to the user by the means used to pierce the septum as the device is pulled off upwards. During this removal process, any sample residues which might still be adhered to the means are wiped off by the septum and are left behind in the container, thereby improving the quality of the analysis in terms of quantitative evaluation. Even if the device with the containers joined to it is placed upside down, i.e. so that the second container to which the sample was transferred sits above the first container, there is no risk of parts of the sample leaking to the environment when the device is removed from the second container, precisely because these sample parts flow back into the first container via the piercing means. The resultant gain in safety is of particular importance to the user, who might be handling infectious blood samples, in particular HIV or HCV samples. The fact that the device is removed at the same time as the first container makes operation very rapid, which is necessary in the case of samples susceptible to deterioration, and, this being the case, by using a container fitted with a device as proposed by the invention or a container of the type in accordance with another embodiment of the invention, the first container can be sealed immediately before it is removed. Simultaneous removal of the device with the first container is also an important feature in situations where reagent solutions in containers have to be mixed with the sample, because the containers can hold a larger volume of reagent solution than that needed for individual analysis. In this case, for understandable reasons, devices that have already been used to connect two containers can not be used again because the reagent solution could become contaminated by the sample. It is of advantage to fit the device proposed by the invention with a barrier element to interrupt the flow connection between the two containers, in which case the continuous connection between the vessels is not released until immediately after the containers are secured in the two connecting regions of the device. The advantage of being able to stop the flow connection at any time is that the container enclosing the original sample can be partially emptied to a certain specific degree, enabling the sample to be divided between several individual containers without difficulty. A barrier element of this type is also of advantage when it comes to placing the sample in contact with a reagent solution, because it enables a specific volume of reagent solution to be added to the sample and this process can be halted if necessary to allow the quantity already added to react if necessary. It is of advantage to provide appropriate graduation markings, either on the container itself or on the device, to indicate the respective volume that has already been transferred.

As mentioned above, a container of the type defined herein the application is also of advantage, especially if using reagent solutions, since these can be prepared on a larger scale than would be necessary for an individual analysis, which is beneficial due to the time that can be saved when performing a batch of tests. However, this also means that the quality of these reagent solutions used for several samples will remain constant. On the other hand, a container of this type also offers advantages if used for an analysis kit as proposed by the invention, especially if the individual components of the kit are to be combined with one another for an individual test, thereby reducing the individual elements of the kit accordingly and simplifying the work of the user. Furthermore, as a result of this design, there is no need to provide the container with a septum, for example, which offers cost advantages with regard to the production of such analysis kits because the container can be made in a single work process, for example by injection moulding.

Devices of the type defined herein the application also offer an advantage, especially if such devices are used for the analysis kit, since they also enable solid samples, such as tissue samples for example, to be prepared for analysis without incurring the risk of impurities getting into the container in which these samples will be processed due to dirty equipment, for example. With this system, the cutting devices may be made from plastic, for example, which means that devices of this type can in turn be made in a single work process, for example as a disposable product.

Since the cutting device can be disposed in a closure device for a container, however, these systems can also be used more than once, especially if they are made from a material which can be sterilised, and the container on which this device is fitted can also be used again once the sample has been cut up and after preparation of the sample and analysis of the samples, which avoids having to transfer the sample into another container and thus reduces the potential risk of error throughout the analysis.

Other embodiments of the method are defined herein. Of advantage is the fact that the method can be employed universally for a whole range of different applications and purposes, ensuring a reliable transfer of samples in liquid form or in a suspension or emulsion between two containers up to the stage at which the target substance is in the requisite form ready for analysis. Furthermore, it permits the use of existing laboratory equipment, thereby reducing capital investment by the laboratory. In particular, the time needed for analysis purposes can be reduced due to the intervention of a force which can be generated by vacuum pressure or a pressure above atmospheric pressure or by centrifugal force, which means that samples with a high viscosity can also be processed using the method. Another advantage is the fact that providing a closed system for every step of the method minimizes the risk of the sample or target substance becoming contaminated. This approach also offers an advantage insofar as the laboratory does not have to be operated on a clean room basis.

The embodiment with a barrier system incorporating a rotatable passage is of advantage because it enables an additional connecting region for a third container to be provided on the device, for example, and a flow connection can be established alternately between it and one of the other two containers. Another advantage is the fact that this rotatable passage can be provided in the form of a three-way passage, as a result of which a flow connection can be established between three containers simultaneously, so that reagents from different containers can be transferred simultaneously into the container in which the sample is placed. This is a particular advantage if the two reagent solutions react with one another and can not therefore be stored as a single solution.

As a result of another embodiment, the flow passage is provided in the form of a double-ended cannula and the cannula ends constitute the means used to pierce a container seal, as a result of which this flow passage may have thin walls so that the resistance afforded by the septum as it is pierced by these cannula ends can be reduced. This has an added advantage insofar as it enables the use of existing components which have been tried and tested in applications involving the taking of blood samples. Another advantage is the fact that if this device is connected to a washing system, e.g. for nucleic acids, cannulas with a smaller needle diameter can be used, thereby enabling fragmentation of nucleic acids to be initiated.

As a result of the design of a transition region between the connecting regions in which the flow passage is disposed and attached by one or more locking mechanisms, the device can advantageously be used universally for a range of different containers, particularly as regards the length of a container neck, and for a range of different blood sample tubes, for example.

It is also of advantage if a cavity is disposed between the two connecting regions through which the flow passage is inserted, the volume of which is dimensioned so that at least a part of an airtight, elastically deformable protective cap secured to a part of the flow passage projecting into the connecting region, in particular in the cavity, and made from a self-closing elastic material which can be pierced, can be accommodated by the cavity. As a result, the protective cap, which can be pushed back when the blood sample tube is pushed onto the device, is accommodated in this cavity so that the spring action of the "bellows" obtained during fitting does not have a negative effect and hence does not cause any backlash on the fitted container. This improves fitting of the container when placed in this connecting region.

The connecting regions may be cylindrical in shape, with a wall and the internal diameter of the wall may be chosen so that it fits an external diameter of a container part which connects with this connecting region, thereby resulting in a friction lock between a wall internal surface and a container external surface. The advantage of this is that both the means used to pierce a container seal and the container which can be secured in this connecting region are protected, thereby affording better protection for the user of the device proposed by the invention against injury by the piercing means, on the one hand, and enabling the container to be protected against impacts which might otherwise cause it to break, on the other hand, especially if using glass containers. This being the case, it is of advantage if a friction lock is obtained between the container and the device proposed by the invention, because the device is easier to manufacture, given that additional connecting mechanisms such as catches, threaded fittings or similar may be dispensed with if necessary. In addition, this friction lock enables the container to be selectively guided, thereby making it easier for the user of the device to fit the container and in particular to position the container with as much precision as possible.

Another option, whereby the internal surface of the wall has a catch mechanism for accommodating a part of the container, in particular a part of a cap of a blood sample tube. These days, many blood sample tubes, especially their seals, have a web projecting outwards beyond the cap and this web can be used to latch into the device, e.g. in a groove in the internal surface of the device. This ensures that the device is very firmly secured on the fitted container.

It is also of advantage if the wall of the cylinder of the connecting region is made from a deformable material, which conforms to the external contours of the inserted container when the latter is fitted. This improves the airtight seal accordingly, because the region in which the container sits on the device proposed by the invention, i.e. its internal wall, is longer. This also increases the friction force by means of which the device is retained when removing it, especially if the user pulls the device off from above the container.

The connecting regions may be cylindrical in shape, with a wall and the internal diameter of the wall may be chosen so that it fits an external diameter of a container part which connects with this connecting region, thereby resulting in a friction lock between a wall internal surface and a container external surface. The advantage of this is that both the means used to pierce a container seal and the container which can be secured in this connecting region are protected, thereby affording better protection for the user of the device proposed by the invention against injury by the piercing means, on the one hand, and enabling the container to be protected against impacts which might otherwise cause it to break, on the other hand, especially if using glass containers. This being the case, it is of advantage if a friction lock is obtained between the container and the device proposed by the invention, because the device is easier to manufacture, given that additional connecting mechanisms such as catches, threaded fittings or similar may be dispensed with if necessary. In addition, this friction lock enables the container to be selectively guided, thereby making it easier for the user of the device to fit the container and in particular to position the container with as much precision as possible.

Another option, whereby the internal surface of the wall has a catch mechanism for accommodating a part of the container, in particular a part of a cap of a blood sample tube. These days, many blood sample tubes, especially their seals, have a web projecting outwards beyond the cap and this web can be used to latch into the device, e.g. in a groove in the internal surface of the device. This ensures that the device is very firmly secured on the fitted container.

It is also of advantage if the wall of the cylinder of the connecting region is made from a deformable material, which conforms to the external contours of the inserted container when the latter is fitted. This improves the airtight seal accordingly, because the region in which the container sits on the device proposed by the invention, i.e. its internal wall, is longer. This also increases the friction force by means of which the device is retained when removing it, especially if the user pulls the device off from above the container.

In another option, the device is made up of at least two parts which are joined to one another by means of a connection which can be taken apart. This reduces the costs of the user on the one hand, because only one part of the device has to be replaced in order to connect another container, thereby reducing the amount of waste which has to be disposed of. On the other hand, with this embodiment, the containers can be temporarily stored together with one half of the device once they have been taken apart without increasing the risk of injury to the user, because the tips used for piercing purposes point in the direction towards the interior of the containers. This being the case, it is of advantage to use a screw closure or bayonet fitting to obtain the friction fit, because the manufacturer can then design the device so that it fits different container systems.

Finally, it is also of advantage if the flow passage is designed to have several flow passages which connect with one another and a device for piercing a container seal, at least in the area of one connecting region, or these flow passages themselves constitute the device for piercing a container seal which means that the cross section available for transferring the sample can be made larger, on the one hand, and the sample can still be transferred between the two containers, even if one of these flow passages is blocked by the sample or parts of the sample.

Accordingly, an embodiment is of advantage, in which at least one other orifice in the container base and/or in the container wall is provided with a device for producing an airtight connection to another connection or the device is disposed in or on the orifice, in which case the a reagent from another container can be simultaneously transferred to the container at the same time as the sample is transferred.

In another option, the container base and/or the container wall may also be of an elastically deformable design, as a result of which the reduction in volume which occurs when the container is pressed together applies a corresponding pressure to the liquid enclosed in the container, thereby improving and in particular speeding up the transfer of the liquid into another container.

In another embodiment, however, at least a part of the container base may be provided in the form of a plunger affording a leak-proof seal, in which case the container volume can be reduced to enable pressure to be exerted on a liquid enclosed in it in order to transfer it to another container. The advantage of this is that the time during which pressure is applied to the liquid can be predetermined by the user so that the liquid can be transferred in several portions, which is practical in situations where washing fluids for the target substance have to be transferred through a washing system.

It is also of advantage if, a reagent or reagent mixture, e.g. a lysing buffer or an elution liquid, is already available in the interior of the container, so that the container can be integrated in an analysis kit, in which case the user is merely required to attach the individual containers to one another in order to establish a flow connection.

As a result of another embodiment, at least one dividing wall is provided in the interior of the container. Accordingly, this interior can be split into several part-volumes so that different reagents or reagent mixtures needed to prepare a sample of biological origin for analysis can be placed in one container. This also means that a reagent can be placed in a first part-volume, whilst the respective reaction can take place in a second part-volume.

It is also of advantage to provide a slidable plunger in at least one part-volume, the maximum cross section of which at least substantially matches the cross section of the part-volume. This will enable a liquid to be transferred from one part-volume into another part-volume, especially if the dividing wall does not extend across the entire height of the container.

This being the case, it is also of advantage if the plunger can be locked in at least one of its end positions, since this will essentially prevent any unintentional transfer of liquid due to movement of the plunger.

In another possible option, a hollow plunger rod incorporating a chamber may be provided on the side of the plunger remote from the part-volume, and a receptacle containing a matrix is then provided in the chamber, as a result of which the matrix may be of a type intended to remove one component from at least a part of the original sample, and the matrix may be disposed in a receptacle with an outlet. On the one hand, this enables the liquid to be transferred via the plunger rod if necessary and, in particular the sought target substance can be bonded by adsorptive means by this matrix at the same time if it has to be fed through the matrix. This enables the target substance to be removed without the need for additional containers, in which case a variable force can be applied to the plunger and the plunger rod so as to control the timing by which the target substance is removed.

Advantage is also to be had from the fact that the outlet is provided with a shut-off mechanism, which can be switched from a position closing off the outlet into a position in which it is released, thereby enabling the dwell time of the sample in contact with the matrix to be controlled, for example, thereby improving separation of the target substance on this matrix.

In another possible embodiment, a device may be provided in an end region of the plunger rod remote from the part-volume in order to accommodate another container, in which the liquid of the sample separated from the target substance can be received, enabling another component to be isolated during other analysis steps if necessary.

The advantageous system whereby the container can be prepared by providing a reagent or reagent mixture in at least one part-volume was mentioned above.

The fact of providing a transfer passage between the two part-volumes in the another embodiment, enables the size of the dividing wall to be dimensioned so that the part-volumes are placed in flow connection with one another via this transfer passage only, which means that volumes made available for reactions and reagents can be made larger than it would be in containers with smaller dividing walls, whilst nevertheless keeping the external dimensions of the container the same.

This being the case, it is of advantage to close off this transfer passage by at least one barrier mechanism to prevent any liquid from being unintentionally transferred from one part volume to another.

As a result of another embodiment, at least one part-volume has an opening closed off by a septum, so that other reaction solutions can be transferred to this part-volume if necessary, in particular under sterile conditions. It is also possible to provide at least one membrane, e.g, air bellows, in the interior and provide a supply line via an air-tight valve system with a connecting piece, which can be shut off. Consequently, volumes of the container made available for liquids can be reduced by inflating the membrane, thereby enabling the liquid to be subjected to an over-pressure. Conversely, a vacuum pressure can also be generated in the container because the container is filled by the inflated membrane causing air to be sucked out of the membrane. This improves the transfer of liquid into another container.

Variants of the device for cutting up a sample of biological origin into smaller pieces are discussed below.

In accordance with one asoect, the the seal body may be provided at least partially in the form of a self-closing septum, in which case this device enables an airtight flow connection to be obtained between different containers.

It is also of advantage if, the drive shaft is provided in the form of a tube, which may optionally be disposed at the end region lying opposite the cutting device in which a septum is pierced, because the connection between two containers can be made without having to provide additional means for piercing a seal and once the original sample has been cut into smaller pieces, only the drive unit, e.g. the motor, has to be removed and the sample can be transferred from the device to another container without having to open the device. The seal may be retained in a screw cap, which means that existing septums which have already been tried and tested in practical applications may be used.

The design of the analysis kit incorporating a matrix has the advantage of providing the user with a kit incorporating a complete system for separating at least one component from an original sample.

To provide a clearer understanding, the invention will be explained in more detail below with reference to the appended drawings. Of the schematically simplified drawings:

FIGS. 1a.)-j.) illustrate an embodiment of the process sequence for separating at least one nucleic acid from blood;

FIG. 2 shows an analysis kit as proposed by the invention, consisting of a first container, a tube for taking a blood sample and a device for establishing a closed, airtight connection between the container and the blood sample tube;

FIG. 3 depicts another embodiment of the analysis kit proposed by the invention;

FIG. 4 shows another embodiment of the analysis kit proposed by the invention;

FIG. 9 shows another embodiment of the analysis kit proposed by the invention;

FIG. 19 shows a container as proposed by the invention;

FIG. 20 shows a device for cutting up a sample of biological origin in container form;

Figure 6:
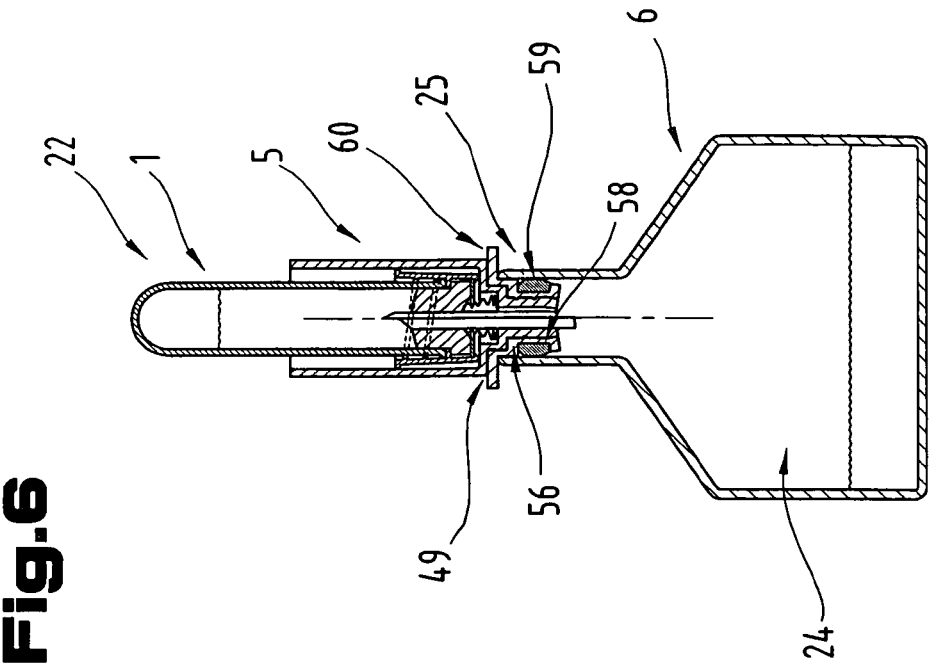
FIG. 6 shows another embodiment of the analysis kit proposed by the invention.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

Individual features or combinations of features from the different embodiments illustrated and described may be construed as independent inventive solutions or solutions proposed by the invention in their own right.

FIG. 1 illustrates one possible process sequence proposed by the invention comprising steps a.) to j.), based on the example of extracting at least one nucleic acid from a blood sample.

At this stage, it should be pointed out that the method proposed by the invention is clearly not limited just to the example of taking blood samples but generally applies to the preparation of samples of biological origin in readiness for analysis. This being the case, the target substances might be nucleic acids, proteins or other molecules from the blood sample, for example, depending on which purification system is used.

The sample itself may be in the form of whole blood or alternatively in the form of individual blood compartments obtained by processing the blood sample accordingly, e.g. by centrifugation, using the method proposed by the invention.

As will be explained in more detail below, the method may also be used to process solid samples, such as tissue samples for example.

Although the method and the device by which it is implemented were developed for examining and processing samples of biological origin, they may naturally also be used for more general analytical work, e.g. for analysing water or such like, and this method offers particular advantages in the case of samples which are susceptible to oxidative deterioration due to oxygen in the ambient air, for example, or which are displaced with reagents or reagent mixtures and pose a potential health risk.

In view of the above explanation, the fact that the invention is described in connection with the analysis of blood samples should not be construed as meaning that it is restricted to this application.

In method step a of FIG. 1, a container 1 is illustrated in the form of a blood sample tube with a screw cap 2. Any blood sample tubes known from the prior art may be used for the purposes of the invention and may be made from glass or plastic, for example. Since blood sample tubes are well known from the prior art, they will not be described in any detail below.

Contained in the blood sample tube is an original sample 3, which in this particular case is whole blood.

This container 1 is pushed in the direction indicated by double arrow 4 into a device 5 for establishing a closed, airtight connection between the container 1 and a second container 6 illustrated in method step b.) until a piercing means 7 retained in the device 5 pierces a container seal in the form of a septum retained by the screw cap 2, although this is not illustrated in detail in FIG. 1.

However, it would also be possible to push the container into the device 5 only so far initially so that its seal is not pierced, in which case piercing does not take place until the second container 6 has been fitted.

In the next step, once the container 1 incorporating the device 5 has been prepared as described above, it is fitted to the second container 6 in method step b.), as indicated by double arrow 8. Consequently, a flow connection is established by the piercing means 7 between the first container 1 and the second container 6 and the device 5 links the two containers 1, 6 forming a closed airtight system.

A reagent or reagent mixture 9 is placed in the container 6, which may be selected from a group consisting of a buffer to break down cells, such as blood cells for example, a stabilising buffer for nucleic acids or proteins, a releasing buffer, a preservative buffer and/or the solid salts of these buffers. With the aid of this reagent or reagent mixture 9, once the original sample 3 or some of this original sample 3, e.g. a pre-definable volume of the original sample 3, has been transferred from the container 1 into the container 6, a component to be detected or naturally also various components to be detected can be treated by means of a reaction with the reagent or reagent mixture 9 in order to stabilise it at room temperature. This is of particular advantage in the case of blood samples, such as whole blood, because, as explained above, nucleic acids from blood cells are broken down by RNAses as soon as the blood is removed from the living body. The term stabilise as used in connection with the invention should be understood as meaning that the component(s) is or are not altered to any significant degree over a period of a few days, e.g. 3 to 7 days, possibly also over a long period, e.g. 1 to 2 months, due to environmental influences, e.g. broken down. However, the term should not be construed as meaning that the component(s) is or are stabilised for an indefinite period. However, the period is long enough for the sample of biological origin to be analysed within a reasonable period and control samples taken from the original sample if necessary.

Stabilisation can be achieved by using a lysis buffer containing at least one chaotropic salt, such as a guanidinium salt for example, as the reagent or reagent mixture 9, which may be selected from a group consisting of guanidinium chloride, guanidinium nitrate, guanidinium carbonate, guanidinium dihydrogen phosphate, guanidinium hydrogen diphosphate, guanidinium sulphate, guanidinium stearate, guanidinium acetate, guanidinium thiocyanate, guanidinium aminosulphate. The guanidinium salt may be used in either solid or liquid form, i.e. in solution, and in the latter case the concentration of guanidinium salt may be in the range of between 2 M and 8 M. The lysis buffer may also contain various additives, such as a detergent, a reducing agent or a buffer substance, for example, in the ranges of concentration specified in patent specification WO 00/09746 A.

At this stage, it should be pointed out that if solutions are used, it is preferable to use aqueous solutions for the reagent or reagent mixture 9. However, it is also possible to use other solutions such as an alcohol, e.g. an ethanol/water mixture, for example.

Depending on the target substance, i.e. the component to be isolated from the original sample 3, the lysis buffer may also be of a different composition and might be a carboxylic acid, a sulphonic acid or a phenol or mixtures thereof, for example. The carboxylic acids which may be used are acetic acid, citric acid, lactic acid, for example, whilst the sulphonic acids which may be used are sulphuric acid, benzene sulphonic acid, p-toluene sulphonic acid, m-nitrobenzene sulphonic acid, alkane sulphonic acids, whilst a phenol which may be used is selected from a group consisting of p-nitrophenol, m-nitrophenol, o-nitrophenol, 2,4-dinitrophenol, p-chlorophenol, p-cyanophenol, 1-chlor-2,4 dinitrophenol. These lysing reagents are preferably added in a concentration of between 0.1 and 1% by volume.

If lysing buffers of this type are used, no further stabilisation is necessary because the nucleic acids have been released from the cells.

On the other hand, however, the reagent or reagent mixture 9 might be a preservative buffer, for example ammonium sulphate. Unlike lysing buffers, this preservative buffer has properties which cause proteins to precipitate, in the same way as the above-mentioned guanidinium salts or urea.

Naturally a preservative buffer of this type may also be used in combination with a lysing buffer as the reagent or reagent mixture 9, for example a combination of ammonium sulphate with guanidinium thiocyanate or more generally a combination of ammonium sulphate with a chaotropic salt. If used separately however, i.e. these reagents 9 are placed in different containers, the original sample can be stabilised by the preservative buffer at the site at which the sample is taken, so that it can be transported without the need for further precautions, in which case the component(s) can then be released using the lysing or releasing buffer in a laboratory later.

The concentration of guanidinium salt may also be reduced to the degree that, although the original sample 3 and the components contained in it are stabilised, no lysis takes place.

As mentioned above, other buffer substances may also be added, such as sodium citrate, Tris or Tris/HCl, for example, in order to keep the solution within a pH range of between 5 and 7.

One possible reagent composition which may be used for whole blood in particular contains for example 10 to 100% by weight of ammonium sulphate, 1 to 6 mol/l of a chaotropic salt such as guanidinium thiocyanate, and a buffer substance in the range of between 0.1 to 0.5 mol/l, for example sodium citrate or Tris/HCl. By preference, a composition is used which contains 5 to 70% by weight of ammonium sulphate, 2 to 4 mol/l of a chaotropic salt and 0.2 to 0.4 mol/l of a buffer substance, in particular a mixture containing 50 to 60% by weight of ammonium sulphate, 3 to 4 mol/l of a chaotropic salt and 0.3 to 0.4 mol/l of a buffer substance. Other compositions could naturally also be used, although they are not explicitly specified here.

In terms of detergents, lauryl sarcosinate and sodium dodecyl sulphate have proved to be particularly effective whilst 2—mercapto-ethanol and dithiothreitol have proved to be effective reducing agents.

Complexing agents may also be added, e.g. EDTA.

For preservation purposes, for example in the case of mammal cells, an alcohol buffer solution may also be placed in the container 6. In this case, the purpose of the alcohol is to fix the mammal cells, in which case it is necessary to provide a pre-definable quantity. Ethanol or methanol have primarily proved to be suitable alcohols. The solution may also contain EDTA as a chelating agent to prevent the formation of lumps. In addition to EDTA, PBS, Tris, sodium acetate, citric acid or such like may be used as buffers.

It would naturally be possible to place the preservative buffer and the lysing buffer in separate containers 6, especially if premature ageing is likely to occur due to individual components in the two buffers reacting with one another, preventing these buffers from being used together. In this case, by using the closed airtight system proposed by the invention, as illustrated in FIG. 1c.), several steps can be operated whereby the sample is firstly placed in a container 6 with a preservative buffer and then transferred to another container 6 with a lysing buffer. The first step, in other words transferring the blood into the preservative buffer, can already be performed by the doctor at the surgery, the advantage of which is that there is no need to transport the blood to the laboratory at low temperature, which is what currently happens. The chaotropic substance can then be added in the actual laboratory.

The composition of the reagent or reagent mixtures 9 is preferably specifically determined, in particular as regards concentration, on the basis of a pre-definable volume of original sample 3 transferred from container 1 into container 6. To be on the safe side, it is also possible to provide a surplus quantity of component(s) in the reagent or reagent mixtures 9.

To enable a pre-definable volume of original sample 3 to be transferred into the container 6, it is also possible to evacuate the container 6, in which case the vacuum pressure is adjusted depending on the volume of original sample 3 which has to be transferred. However, this could also be achieved using other means.

The advantage of this approach is that reagents which give rise to problems, as is the case in particular with guanidinium salts which pose a risk to the health of living organisms, can now be placed in a separate container, in which case there is no risk of the organism coming into contact with these reagents 9 when the sample is being taken, and, when the original sample 3 is subsequently transferred to the container 6, the closed system eliminates any risk of the user coming into contact with the original sample 3 if the system and method proposed by the invention are used correctly. This avoids any contamination of the original sample 3. To this extent, the method proposed by the invention and the system proposed by the invention enable laboratory costs to be reduced because they can also be operated by less qualified personnel without risk, thereby cutting personnel costs. Furthermore, because the components of the system are already pre-prepared, the work itself is simplified, leading to a saving on time.

Once the original sample 3 or at least a part of the original sample 3 has been transferred to the container 6, as indicated in FIG. 1*c*.) by arrow 10, a mixture of the original sample 3 and the reagent or reagent mixture 9 is then obtained in the container 6, as illustrated in FIG. 1*d*.).

The first container 1 is then taken apart from the container 6 again. The separation takes place in such a way that the device 5 which has established the flow connection between the two containers 1, 6 is pulled off together with the container 1 and is so separately from it, irrespective of whether the user is using, i.e. holding, the first container 1 or the device 5 to make the separation.

The first container 1 together with the device 5 can then be disposed of as indicated by arrow 11 (FIG. 1*e*.)) or, if only some of the original sample 3 contained in it was transferred to the container 6, can be stored as a control sample for subsequent analyses. Accordingly, the device 5 can be left on the container 1 so that the device 5 can be used again for subsequent tests, in which case a region 12 of the device which is directed towards the container 6 when the device 5 is in the position of usage can be secured with an appropriate closure, e.g. a screw cap.

Once the target substance has been rendered stable at room temperature, the second container 6, which is likewise provided with a septum 13 and is therefore self-closing, can then be either temporarily stored or preparation can be continued in readiness for analysis. To this end, it is of advantage if another device 5 proposed by the invention is fitted on the container 6 as illustrated in FIG. 1*f*.), although it no longer needs to be airtight because the separation is preferably operated with the aid of a purification device 14, e.g. a purification column containing a matrix 15 and this purification device 14 is open at an end region 16 lying opposite the container 6 to enable the sample mixture to drain out from the container 6. This approach is of advantage firstly because the purification device 14 can be attached by means of the device 5, as will be explained in more detail below, and secondly because it enables the use of different types of purification devices 14 of varying diameters within certain limits of the diameter of the device 5. On the other hand, nucleic acids can be broken down into fragments by means of the piercing means 7 as the sample drains out of the container 6 because of the small diameter of the device 5.

The container 6 with the purification device 14 attached to it is then turned upside down, i.e. so that the purification device 14 is pointing downwards, and inserted in another container 17, in which case the container 6 can be secured by the upper region of the container 17 so that the open end region 16 of the purification device 14 does not extend down as far as the base region 18 of the container 17, as illustrated in FIG. 1*g*.). The container 17 may also optionally be closed with a closure cap, e.g. a screw cap (not illustrated in FIG. 1*g*.)).

The container 17 may be a centrifuge tube with a 50 ccm capacity, for example. This means that standard sizes of these types of centrifuge tubes may be used and the system proposed by the invention can therefore be combined with known components to form an analysis kit.

As indicated in FIG. 1*g*.) by a curved arrow 19, the sample/reagent-reagent mixture in the container 6 is transferred out of the container 6 through the purification device 14, i.e. the matrix 15, by centrifugal force and the separated liquid is caught in the container 17 as illustrated in FIG. 1*h*.). During this transfer, the target substance or substances to be analysed is or are retained by the matrix 15 and when the container with the device 5 has been separated from the container 17 and removed from the purification device 14 the target substance(s) is or are isolated for further processing.

The container 17 and its contents may either be thrown away or, if it still contains other target substances, sent for further preparation.

The container 6 with the device 5 can also be disposed of separately.

Finally, as illustrated in FIG. 1*j*.), before being sent for analysis, e.g. a PCR, the target substance(s) is or are then eluted out of the matrix 15 with the aid of an elution agent 20—as illustrated in FIG. 1*j*.) in the form of a droplet—into a fourth container 21.

In another mode of implementing this method, instead of the container 17, e.g. the centrifuge tube, it is also possible to use a device proposed by the invention for establishing a closed, airtight flow connection which can then be connected between the container and the other container 17, in which case the purification device 14 may also project into the other container 17.

It would naturally also be conceivable for the purification device 14 to be designed as part of the device 5, in which case this device 5 will be used for this method step. Another possibility is one in which a closed airtight system is established between two containers for all the other method steps by connecting the individual containers to one another by means of the device 5, for example washing containers containing liquid detergent, in order to wash off any residues of sample/reagent-reagent mixture still adhered to the matrix 15 in one or more steps.

The elution agent 20 may also be kept in a container of this type and connected by means of the device 5 to another such container so that it catches the eluate via the device 5.

Centrifugal force may be used to transfer the liquid, as described above. Another possibility is to transfer the liquid by generating a vacuum pressure or a pressure above atmospheric pressure in a container.

As a result of the invention, therefore, the user has a method with a multi-modular, closed system, by means of which samples can be purified or preserved for subsequent testing, which means that there is a minimum or no risk of the user becoming infected when handling problematic samples, such as blood for example. Furthermore, because the device is designed to connect two containers, the method and system proposed by the invention can be used with different types of blood sample tubes, which means that the system can be used to a certain extent irrespective of manufacturer, provided there exists some means for piercing the blood sample tube.

FIG. 2 illustrates an analysis kit 22 consisting of the first container 1 with an interior 23, the second container 6 with an interior 24, which in this particular example of an embodiment contains the reagent 9 or reagent mixture needed for preparation and analysis purposes, e.g. a lysing buffer, and a device 5 disposed between the containers 1, 6 by means of which a closed, airtight flow connection can be established between the interiors 23, 24 of the containers 1, 6. In the two oppositely lying end regions, this device 5 has first and second connecting regions 25 and 26 for receiving a part of the containers 1, 6. Naturally, it would also be possible for these connecting regions 25, 26 to be arranged in a disposition other than that illustrated in FIG. 2, e.g. at right angles to one another, or more than two connecting regions 25, 26 could be provided, thereby enabling another reagent or reagent mixture 9 to be added at the same time as the sample is transferred to the container 6.

A middle region 27 is formed between these connecting regions 25, 26.

The purpose of the first, bottom connecting region is to accommodate the container inlet, i.e. a neck of the container 6, and that of the second connecting region 26 to accommodate the container 1.

As mentioned above, the container 1 may be designed as a blood sample tube fitted with a closure cap, e.g. the screw cap 2, incorporating a septum 28. Naturally, the septum 28 could also be provided on the container 1 without using other aids such as the screw cap 2, in a manner known from the prior art.

In the example described here, the blood sample tube contains whole blood, but it might equally also contain any other blood fraction, such as plasma or serum, for example, or alternatively any other type of sample, such as tissue samples of human, animal or vegetable origin. It might likewise contain cells, e.g. tumour cells, mononuclear cells, CD 34* parent cells, buffy coat, other human and animal bodily fluids, such as exudates, transudates, urine, cerebrospinal fluid, stools, cell homogenisate, cell cultures, etc., for example.

The particular form in which this original sample 3 is held in the container 1 is intended for pre-processing, e.g. centrifugation.

The device 5 is preferably designed so that at least one connecting region 25, 26 is designed in the form of a cylinder 29, 30 with a cylindrical wall 31, 32, in particular the connecting region 26 for container 1, in other words the blood sample tube. Said cylindrical wall 31 may be made from a deformable material, which conforms to the external contours of the blood sample tube, in particular a part of the screw cap 2, when inserted in the blood sample tube. A design of this type represents an easy means of securing the blood sample tube or container 1 very firmly in the connecting region 26, for example by means of a friction lock. Naturally, the wall should not be made from a material that is so flexible that it prevents the blood sample tube from being secured.

Another possible way of fixing the container 1 in the connecting region 26 of the device 5 is to provide one or more catch mechanisms 34 on an internal wall surface 33 of the cylinder 29 of the device 5 directed towards the container 1, as illustrated in FIG. 2. This being the case, this catch mechanism 34 may be provided in the form of a groove-shaped recess 35 in the wall surface 33. Instead of or in addition to this groove-shaped recess 35, which preferably extends around the entire internal circumference of the cylinder 29, it would likewise be conceivable to provided a projecting, preferably continuous web 36, as indicated by broken lines in FIG. 2. As a result, if the screw cap 2 of the container 1 or more generally a closure device for the container 1 also has an annular web 37 in at least one point as illustrated in FIG. 2, this annular web 37 may either locate in one of preferably several recesses 35 and latch in the direction towards the container 6 underneath the web 36, so that it is fixed to prevent the container 1 from being unintentionally pulled out of the device 5, i.e. from the connection region 26 of the device 5.

Instead of this means for securing and/or fixing the container 1 in the connecting region 26 of the device 5, it would naturally also be possible to provide other means in the device 5 for this purpose, i.e. in the connecting region 26, or to design this region specifically for this purpose. One such option was mentioned above, namely that of adapting the diameter of the cylinder 29 of the connecting region 26 for the container 1 to the external diameter of the container 1 and its screw cap 2, thereby creating a friction lock between the cylinder 29, i.e. its internal wall surface 33, and the container 1.

Another possibility is to provide a screw thread arrangement on the wall surface 33 so that a container 1 fitted with a screw cap 2 incorporating the annular web 37 can be screwed into this connecting region 26.

With all these means and precautions for securing and/or fixing the container 1 in the connecting region 26, it should be possible to apply a force to this container 1 that is greater than the force which prevents the container 6 in the other connecting region 25 from coming apart from the connecting region 25 for the container 6. Consequently, when the container 1 is pulled off, the device 5 is also simultaneously separated from the container 6.

Disposed between the first and second connecting region 25, 26 of the device 5 is a flow passage 38, which may be designed as a two-way needle or cannula. This flow passage 38 is preferably held centred in the middle region 27 of the device 5. A separate retaining mechanism 39 may be used for this purpose, e.g. an appropriately shaped moulded piece made from plastic for example, disposed in the middle region 27 of the device 5. In terms of its geometry, this retaining mechanism 39 may be dimensioned so that a friction lock is created between the surface of the retaining mechanism 39 and an internal surface in the middle region 27 of the device 5. Other fixing methods may also be used, such as adhesive, screws, etc.

The retaining mechanism 39 has an end-to-end recess 40, preferably at its centre, by means of which and from which the flow passage 38 is inserted and retained.

Naturally, this recess 40 need not necessarily be arranged at the centre and the flow passage could also be retained off-centre if necessary.

Nor is it necessary for the retaining mechanism 39 to be provided as a separate part and instead it may also be integrally joined to the device 5, in other words moulded when the device 5 is manufactured, e.g. by an injection moulding process.

It is likewise not necessarily vital for the flow passage 38 to be provided in the form of a double-ended needle and any other suitable mechanisms performing the same function or similar devices for establishing a flow connection may be used, as will be explained in more detail in connection with other embodiments below.

It is preferable if the device 5 has a tapered region 42 along the course of its longitudinal extension, i.e. along a longitudinal mid-axis 41, e.g. in the middle region 27 between the two connecting regions 25, 26. The advantage of providing this tapered region 42 is that the device 5 can be more easily held by the user at this point. This being the case, gripping surfaces could be provided in the area of this tapered region, which might also have knurling, for example, to make it easier to grip with wet fingers or when wearing gloves.

A cavity 43 is preferably provided in the device 5 between the middle region 27 and the top connecting region 26 for the container 1. This cavity 43 may be at least partially bounded in the direction of the longitudinal mid-axis 41 by a continuous web 44 in the region of the container 1, i.e. in the region of an end face 45 of the screw cap 2, and in the direction of the bottom container 6 by the retaining mechanisms 39 for the flow passage 38 mentioned above. The wall of the device 5 forms the side boundaries.

The cavity 43 may be designed to at least partially accommodate a protective cap 46 for covering certain regions of the flow passage 38 in at least one end region, e.g. a pipe valve of the type known from the prior art. When pushed onto the container 1, i.e. inserted in the top connecting region 26, the elastic protective cap 46 is displaced with the screw cap 2 of the container 1 and at least partially pushed into the cavity 43, as illustrated in FIG. 1.

In the state in which the container 1 is inserted in the connecting region 26, the flow passage 38 protected by the protective cap 46 penetrates the septum, preferably down as far its surface pointing towards the interior 23 of the container 1. This embodiment enables the container 1 to be almost completely emptied, especially if the septum—not illustrated in FIG. 2—has a concave camber, or convex as viewed in the direction towards the interior 23.

Naturally, it would also be possible for the flow passage 38 to be longer as illustrated in FIG. 2, so that the flow passage end region 47 projects into the interior 23 of the container 1. In order to penetrate the septum 28 of the container 1 and the septum 13 of the container 6, at least one means is provided in at least one connecting region 25, 26, preferably in both connecting regions 25, 26, for piercing a container seal. As may be seen from FIG. 2, this piercing means 17 may be the flow passage itself and in the specific case illustrated in FIG. 2, the end regions of the double-ended cannula which taper to a point.

With a flow passage 38 of this design and by dimensioning the septums 28, 13 accordingly, i.e. as illustrated in FIG. 2, the septum 28 of the container 1, in other words the blood sample tube, is longer in its longitudinal extension in the direction of the longitudinal mid-axis 41 than the longitudinal extension of the septum 13 of the container 6 in the same direction and/or, if different materials are used for these two septums 13, 28, it is also possible to apply a differing force to this flow passage 38 so that the flow passage 38 of container 1, i.e. the septum 28, can be secured by means of a stronger force than that used for the septum 13 of the container 6. As a result, when container 1 is pulled apart from container 6, the device 5 is pulled off with it. In addition to the retaining mechanisms for the container 1 described above, this embodiment of the invention may also incorporate the catch mechanism or be specifically designed for this purpose.

In the top connecting region 26, the connection to the container 1 may be a separable connection, e.g. a screw connection, a bayonet fitting, a friction lock, etc. The advantage of using a bayonet fitting is that it requires only a one eighth to one quarter turn of the flow passages 38 once the septum 28 has been pierced. Further turning of the septum 28 could create more friction and this could lead to the original sample 3 in the container 1 becoming contaminated.

The system described here may be used in a doctor's surgery, a laboratory or a hospital, for example for RNA/DNA analysis. Due to its construction, work can be conducted in an particularly aseptic environment for laboratory staff. The device 5 for establishing the flow connection is able to prevent unintentional contamination, for example in the case of blood, particularly when transferring the blood into the bottom container 6. The safety of the system can also be further improved due to the fact that the end region of the flow passage 38 directed towards the interior 24 of the container 6 may also be fitted with a protective cap, e.g. a plug valve, made from an elastic self-closing material, such as a rubber for example. If the plug valve is closed carefully on finishing the transfer process and when taking the device 5 out of the container 6, the liquid can be prevented from dripping. For storage purposes, for example if additional control tests will be needed at a later date, the container 6 may be provided with appropriate means, e.g. a self-adhesive label printed with a bar code, amongst other things, or a memory chip, and held in cold storage.

The flow passage 38 may also be retained alternately in the device 5 to produce a flow connection between the containers 1, 6. To this end, a screw thread may be provided in the middle region 27, e.g. in the retaining mechanism 39, in which the flow passage 38, which likewise has a screw thread on an external face in this case, is screwed into the device 5.

Another possibility is to design the two connecting regions 25, 26 so that they each have a different internal diameter and optionally, with a different external diameter, the advantage of which is that, if the other elements of the analysis kit 22 are designed accordingly, for example the diameter of the neck of the container 6, as opposed to the diameter of the container 1 and its screw cap 2, the device 5 can not be connected to the containers 1, 6 the wrong way round.

It is also of advantage if the flow passage 38 does not project out beyond the two end regions of the device 5, as illustrated in FIG. 2, in which case the user will not come into contact with the piercing means 7 unless he consciously reaches into the connecting regions 25, 26.

If the device 5 has another or other connecting regions for a third or more containers, these connecting regions may naturally also be of the same design described above.

The septums 13, 28 may be made from bromobutyl rubber, known from the prior art.

If the container 1 is designed to serve as a blood sample tube, it may optionally contain a gel if centrifugation is necessary before proceeding with the method proposed by the invention, as also known from the prior art, enabling a separation into plasma and serum to take place during centrifugation.

In order to process cell fractions, e.g. from blood samples, it may be of advantage to provide the container 1 with a flap in the interior 23, as specified in patent specification WO 00/46585. The disclosures of this WO-A specification form part of the subject matter disclosed in this patent application.

In this case, the container 1 may be designed in the form of a centrifuge tube with a 50 ml capacity, for example, and the neck of this centrifuge tube may be fitted with a septum which can be fixed by means of a screw cap 2. The diameter of the neck is preferably such that a conventional adapter for taking blood samples can be connected to it, enabling this centrifuge tube to be used for taking blood samples. By adapting the size of the blood sample adapter accordingly, it will naturally also be possible to work with containers 1 of a different neck diameter. The flap mentioned above is disposed inside this container 1. The flap may form the base of the centrifuge tube, in other words the base may be substantially flat as opposed to the known centrifuge tubes which have bases of an essentially conical shape. The base may also be tightly sealed by means of a lid before and after centrifugation, for example in readiness for transportation. This container 1 is preferably evacuated to enable a blood sample of 25 to 30 mm to be taken.

Then, once the lid has been screwed off the base, this container can then be introduced into a bigger outer vessel, e.g. a 50 ml centrifuge tube, in which a cell separating medium is placed, such as that sold under the OncoQuick® trade mark by Hexal Gentech Forschungs GmbH of D-83607 Holzkirchen or Greiner Bio-One GmbH of D-72636 Frickenhausen. During centrifugation, the blood comes into contact with the separating medium and the cells are separated due to their density. The flap fulfils a particular function in this respect in that the desired cell fraction is available in the blood sample tube, i.e. in container 1, after centrifugation. The flap is designed as defined in patent specification WO 00/46585 A, so that it opens in the region of the walls of the container 1 during centrifugation, as explained in the WO-A patent specification, for example. Having been prepared in this manner, the container 1 is then connected to the device 5 proposed by the invention and the cell fraction is then transferred to container 6, in which a lysing buffer and/or a preservative buffer in liquid form may be placed.

Since the analysis kit 22 can be prepared in readiness for holding a certain volume of blood, the length of the flow passage 38 in the direction of the longitudinal mid-axis 41 may be so dimensioned that if a centrifugation step has to be carried out first, the end region of the flow passage 38 is large enough to accommodate a pre-definable fraction of blood so that only this fraction is transferred to the container 6.

The container 6, which may be described as a reaction container for example given that it contains the reagent or reagent mixture 9, may be designed so that a diameter of the neck is adapted to the diameter of the connecting region 25 of the device 5, as illustrated in FIG. 2. For example, the device 5 may be screwed onto the neck of the container 6. This being the case, the screw connection should not be so firm that that the device 5 can not be pulled off simultaneously with the container 1 when the container 1 is removed. To this end, the connecting region 25 for the container 6 of the device 5 may be made from an elastically deformable material.

Apart from this screw connection, it would naturally also be possible to use other types of connection systems, e.g. the device 5 could be simply pushed on, thereby producing a friction lock between the external surface of the neck of the container 6 and the internal surface of the connecting region 25, i.e. of the cylinder 30 of the device 5. Other connection systems could also be used, such as a Luer lock, a bayonet fitting, catch mechanisms, etc. Again, the force which this connection system exerts on the neck of the container 6 is less than the force by which the container 1 is secured in the connecting region 26 of the device 5.

If necessary, the container 6 may have a pre-definable capacity, e.g. 1, 2, 5, or 10 ml etc., depending on the capacity for which the analysis kit 22 is intended.

The container 6 is preferably evacuated so that a specific volume of original sample 3 or pre-processed sample can be drawn off.

If working with samples or sample constituents that are particularly sensitive to oxidative media, the container 6 may be filled with an inert gas, e.g. nitrogen, argon, helium or similar.

FIG. 3 illustrates another embodiment of the analysis kit 22, in which the device 5 for producing an airtight flow connection between container 1 and the container 6, in which a reagent or reagent mixture 9 is placed, essentially corresponds to the embodiment illustrated in FIG. 2 and the explanations given above also apply here. The feature that is different in this case is the fact that the device 5 has a different retaining element 48 for the container 1 in the transition region between the middle region 27 and the top connection region 26 for the container 1.

As explained above in connection with FIG. 2, the top connecting region 26 for the container 1 is separated from the middle region 27 of the device 5 by means of a separating element 49 which preferably extends perpendicular to the longitudinal mid-axis 41 and is preferably made integrally with the device 5. This separating element 49 preferably has an opening in the region of the longitudinal mid-axis 41, through which the flow passage 38 is inserted.

This separating element 49 is extended in the region of the longitudinal mid-axis 41 and a separating element end region 50 directed towards the container 1 has a bigger diameter than a transition region 51 of the separating element 49 directed towards the container 6 directly adjoining it and lying underneath. This forms a groove 52, so that the screw cap 2 has a bigger recess in the end region 53 directed towards the separating element 49 in order to permit access to the septum 28 lying directly underneath, i.e. in the direction towards the interior 23 of the containers 1, for the piercing means 7, which in this case is the flow passage 38. If this end region 53 of the screw cap 2 is of an elastic design, this end region 53 will at least partially locate in the annular groove 52 of the separating element 49 when the container 1 is fitted on the flow passage 38, i.e. when the container 1 is pushed into the connecting region 26 of the device 5, and will therefore be engaged so that the container 1 is secured in the device 5. This is possible in particular because septums are usually made from rubber, e.g. bromobutyl rubber, in other words an elastic material, so that the septum 28 of the container 1 also flexes during fitting enabling such an engagement. Although the connection between the device 5 and the container 6, in particular its neck, is a screw connection, it would naturally also be possible to use other types of connection, as mentioned above.

All the details given above in connection with FIG. 2 apply to the container 1 and the container 6, as well as the explanations relating to the device 5, and it should be pointed out that this also applies to all of the other embodiments, although this will not necessarily be explicitly stated below.

It should also be pointed out that the individual parts of the analysis kit 22 proposed by the invention used in the various embodiments are interchangeable and the analysis kit 22 can be extended, as will be explained below in respect of yet other embodiments.

FIG. 4 illustrates another embodiment of the analysis kit 22, in which the device 5 for connecting the containers 1, 6 has a pressure-compensating passage 54. This being the case, this pressure-compensating passage 54 penetrates to a level above a liquid level 55 of the container 1 or blood sample tube when turned upside down, located in the connecting region 26 of the device 5. As the liquid flows from the container 1 into the container 6, quantities of air are carried through the pressure-compensating passage 54 out of the container 6 into the container 1. Accordingly, the pressure between container 6 and container 1 is compensated. This improves the transfer of liquid between these two containers 1, 6, which might otherwise be prevented due to a vacuum pressure above the liquid level 55 in the interior 23 of the container 1 caused by liquid as it flows out. This embodiment is used in particular if the container 6 in which the transferred liquid and original sample 3 are held, and which may again contain a reagent or reagent mixture 9, is not evacuated.

As may be seen from FIG. 4, the device 5 for connecting the two containers 1 and 6 does not have the narrower cross section in the middle region 27 between the two connecting regions 25, 26 described above, which means that the device 5 has a substantially cylindrical shape from the outside.

As may also seen from FIG. 4, said separating element 49 for separating the two connecting regions 25, 26 and for retaining and guiding the flow passage 38 and/or the pressure-compensating passage 54 is disposed in the transition region 27 and is provided in the form of a perforated disc with at least one central orifice through which the flow passage 38 and the pressure-compensating passage 54 are inserted, and in particular is integral with the device 5. The volume of the central orifice and a cavity disposed underneath it may be such that at least a part of the protective cap 46 can be accommodated in this volume when pushed back. The length of the protective cap 46 itself may advantageously be such that this protective cap 46 also surrounds the pressure-compensating passage 54 when the container 1 is not connected to it. The separating element 49 also sits directly against an external surface of the seal of the container 6, e.g. the septum 13.

In this particular embodiment, the container 1 is retained in the device 5, in particular in the connecting region 26, solely by a friction lock between the corresponding surfaces of the devices 5 and the container 1 and protective cap 2 of the container 1.

As also indicated in FIG. 4 by broken lines, the length of the pressure-compensating passage 54 in the direction of the longitudinal mid-axis 41 is adapted to accommodate the predefinable volume of the original sample 3 held in the container 1 so that the end region of the pressure-compensating passage directed towards the interior 23 extends into the container 1 beyond the liquid level 55. This being the case, it may be necessary for the device 5 to be longer in the direction of the longitudinal mid-axis 41 so that when a container 1 is not connected, the end region of the pressure-compensating passage 54 is covered by the wall of the device 5, i.e. the wall of the connecting region 26 in the direction parallel with the longitudinal mid-axis 41, thereby protecting the user accordingly.

In another embodiment very similar to this but not illustrated, the flow passage 38 and the pressure-compensating passage 54 may be disposed concentrically with one another, in which case the pressure-compensating passage 54 extends at least partially through the flow passage 38, leaving a substantially annular gap free for the original sample 3 to be transferred.

As may be seen in the connecting region 25 for the container 6 in FIG. 4, the container 6 in the embodiment illustrated in FIG. 4 is not connected to the device 5 by a screw thread but by individual snap-fit seals. These snap-fit seals do not have to be distributed around the entire circumference of the neck of the container 6, which means that by slightly turning the device 5, the catch connection of this snap-fit seal is released, enabling the device 5 together with the container 1 to be pulled off container 6 by applying only a light force.

This effect can be assisted by using an elastic material for the device 5, at least in the connecting region 25 for the container 6, so that the wall of the connecting region 25 gives way as the device 5 is pulled off, releasing the catch-connection of the snap-fit seal.

The end regions of both the flow passage 38 and the pressure-compensating passage 54 may be specifically designed to pierce a container seal, in particular the septums 13, 28 of the container 6, 1. As another alternative (not illustrated in FIG. 4), the flow passage 38 and the pressure-compensating passage 54 may be mounted in a retaining element 48 designed as a stopper. The dimensions of this retaining element 48 are preferably such that an annular gap is left free between the wall of the device 5 in the connecting region 25 and the retaining element 48, in which the wall of the neck of the container 6 is at least partially received.

In this embodiment, therefore, the container 6 can be sealed by means of a film seal at the working end and this film seal will then be torn as the device 5 is pushed on, after which the container 6 will be closed by means of the retaining element 48. As the container 1 with the device 5 is pulled off the container 6, the flow passage 38 and the pressure-compensating passage 54 slide out of the mounting in the retaining element 48, which again may be a septum 13 for example, so that this retaining element 48 then forms a tightly sealing stopper for the container 6. This means that existing machines which have been tried and tested may be used to manufacture and fill the container 6, for example those known from the pharmaceutical industry enabling the container 6 to be sealed.

Figure 5:
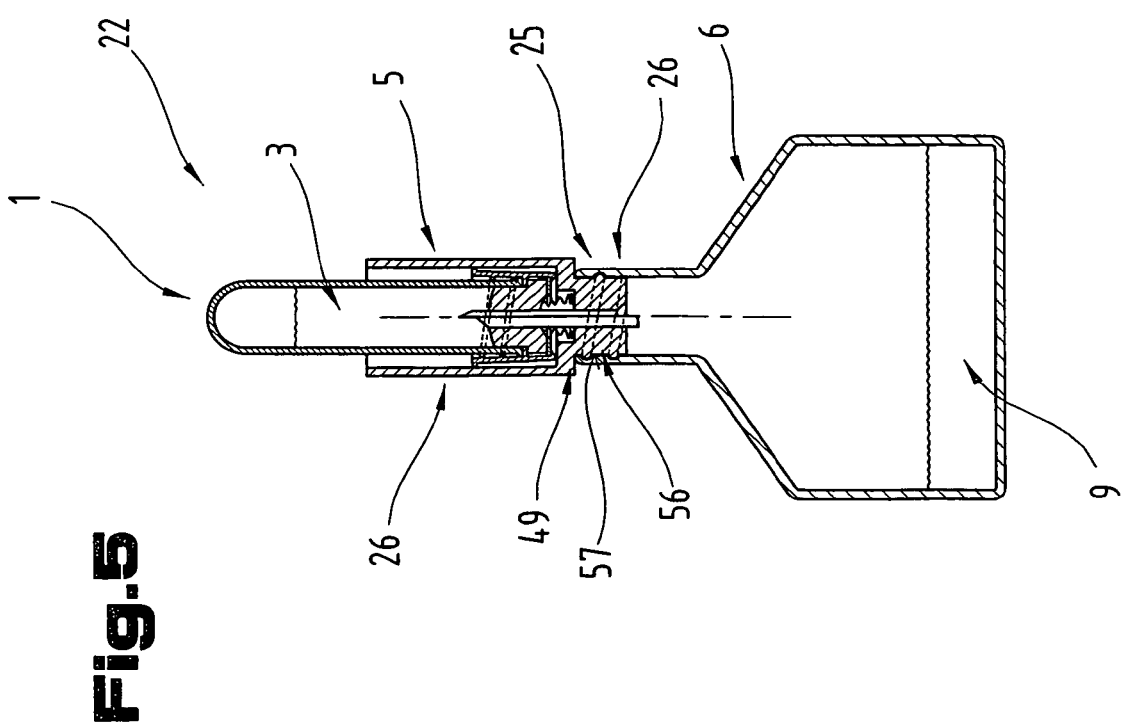
FIG. 5 shows another embodiment of the analysis kit proposed by the invention.

FIG. 5 illustrates another embodiment of the analysis kit 22 consisting of the container 1, the container 6 and the device 5, with an airtight flow connection in the form of a closed system disposed between the containers 1, 6.

In this embodiment, the bottom connecting region 25 for the container 6 is not provided in the form of a cylindrical wall 32 such as that used in the embodiments described above, but is a sealing stopper 56.

On an external stopper surface 57, the sealing stopper 56 has an external thread which can be located in the internal thread in the neck region of the container 6, thereby enabling the airtight flow connection to be established.

This embodiment of the analysis kit 22 is particularly suitable for use with original samples 3, which are not susceptible to oxidation or for situations in which a reagent or a reagent mixture 9 placed in the container 6 is of the type used to initiate a reaction with the original sample 3, after which the target substance is stabilised. This embodiment is also suitable for operating a different mode of implementing the method proposed by the invention, namely whereby the device 5 is firstly connected to the container 6 and only then is the container 1 inserted in the connecting region 26 of the device 5, thereby establishing the flow connection between the two containers 1, 6. When the container 1 incorporating the device 5 is pulled off, the container 6 remains open.

Again with this embodiment, the device may be provided with a removable sealing stopper 56 so that it remains in place when the container 1 incorporating the device 5 is pulled off, thereby sealing it. To this end, at least one tear-off point may be provided in the transition region between the sealing stopper 56 and the separating element 49, which is also provided on this embodiment as a means of separating the two connecting regions 25, 26. Naturally, the container 6 used with this embodiment may also be provided with a film seal from the outset.

FIG. 6 illustrates an embodiment of the analysis kit 22 that is very similar to the embodiment illustrated in FIG. 5. Again, the connecting region 25 for the container 6 of the device 5 for connecting the container 1 to the container 6 is of a stopper-type design in the form of the sealing stopper 56. In order to seal and thus produce the airtight flow connection, the sealing stopper 56 has an annular groove 58 in which a rubber element 59 is inserted as a sealing element.

Also in this embodiment of the device 5, the separating element 49 is of a cylindrical shape in the direction extending towards the interior 24 of the container 6 and a diameter of this cylindrically shaped separating element 49 is such that a clamping element 60, e.g. a clamping ring, can be disposed between an internal surface of the neck of the container 6 and the separating element 49 in this region when the container 6 is connected. The surfaces where the clamping element 60 sits in contact with the separating element 49 may be of a conical design, in which case a screw connection can be provided between these two components, so that when the device 5 is turned in the neck of the container 6, the clamping element 60 is clamped against the internal surface of the neck of the container 6 and the rubber element 49 can also be pushed against this surface of the neck of the container 6 to produce a seal. The clamping element 60 thus forms the annular groove 58 in which the rubber element 59 is placed.

The container 6 can be separated from the device 5 either by turning the device 5 or alternatively by pulling the separating element 49 out of engagement with the clamping element so that the rubber element 59 is no longer clamped and the container 1 together with the device 5 can then be pulled off the container 6.

Figure 7:
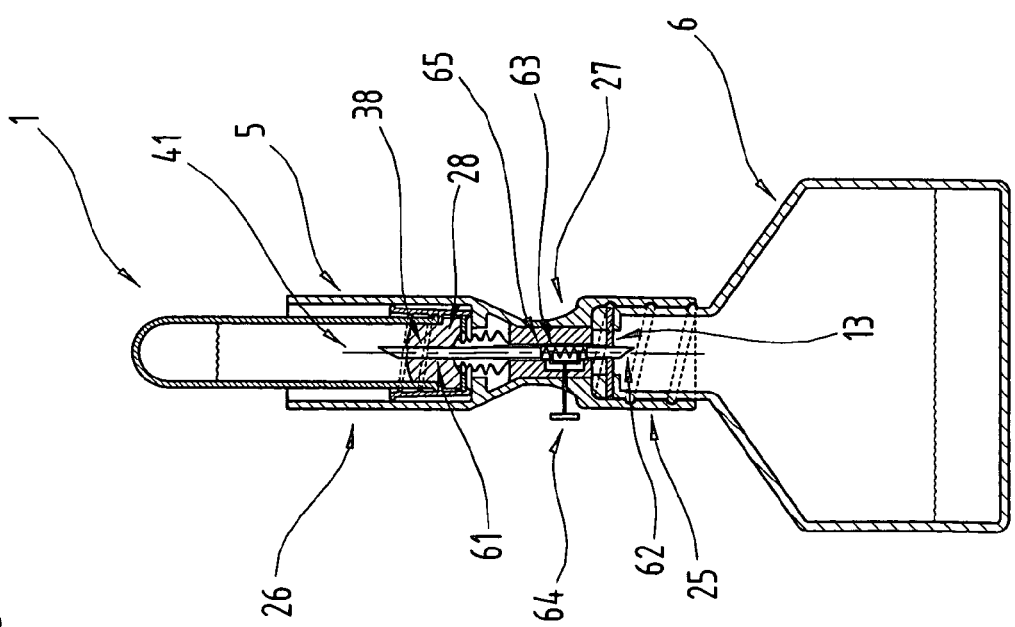
FIG. 7 shows another embodiment of the analysis kit proposed by the invention.

The flow passage 38 of the device 5 illustrated in FIG. 7 is in two pieces with a spring element 63 disposed between the two flow passage parts 61, 62 in the direction of the longitudinal mid-axis 41. This spring element 63 may be designed so that its spring force is greater than the force needed to pierce the container seals or the septums 13, 28. The spring element 63 may also be held in a biassed state by means of a locking mechanism 64, which may be guided towards the exterior in the middle region 27 of the device 5, for example by its wall, which is operated by the user, until the two containers 1, 6 are inserted in the associated connecting regions 25, 26 of the device 5. When the locking device 64 is released, the spring element 63 relaxes, transmitting a corresponding force to the flow passage parts 61, 62, which then simultaneously pierce the container seals, in particular their septums 13, 28. The piercing action of the device 5, i.e. its flow passage parts 61, 62, can be specifically defined by choosing different materials and/or a different structural length in the direction of the longitudinal mid-axis 41 of the two septums 13, 18, resulting in a short time delay in the sequence in which the two container seals are pierced.

The two flow passage parts 61, 62 in this particular example are retained so that they can slide in a guide element 65 of the device 5, at least in the region of the spring element 63, thereby enabling the two flow passage parts 61, 62 to be guided.

Figure 8:
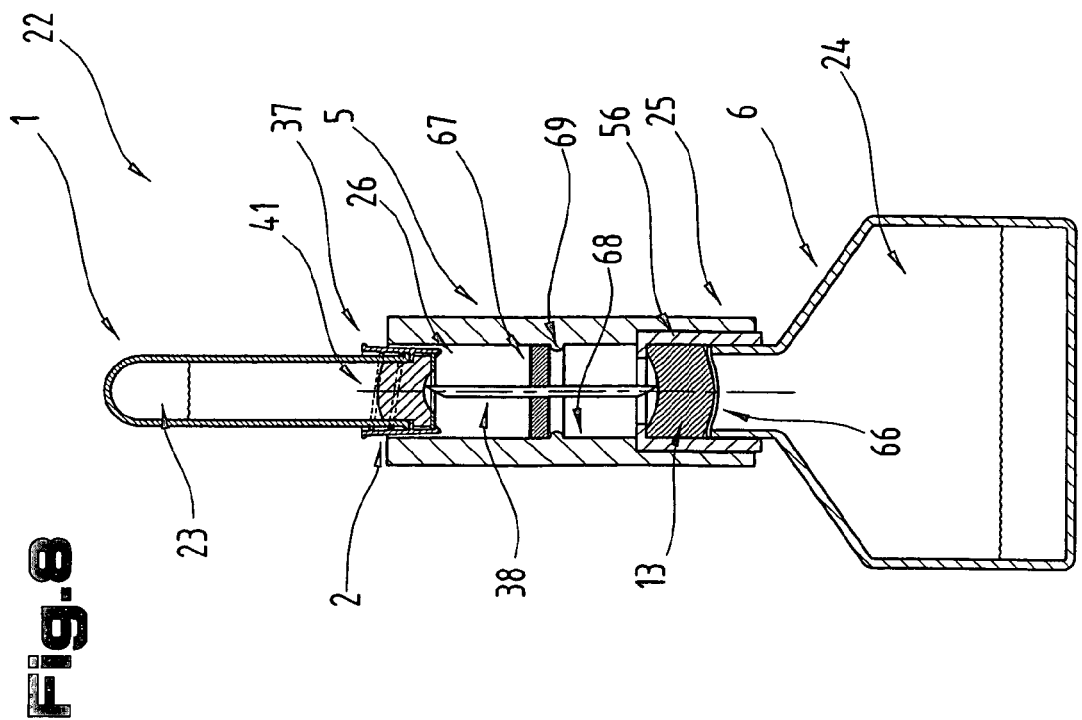
FIG. 8 shows another embodiment of the analysis kit proposed by the invention.

FIG. 8 illustrates another embodiment of the analysis kit 22 with a device 5 for connecting the container 1 to the container 6. The container 6 is closed by means of a seal element 66 with a very slim wall thickness, for example a film seal.

The device 5 in this embodiment has a sealing stopper 56 inserted in the device 5 in the connecting region 25 for the container 6, which again has a septum 13.

A friction lock is produced both between the sealing stopper 56 and the wall of the device 5 surrounding it and between the sealing stopper 56 and the neck of the container 6 on which the device 5 is fitted, thereby fixing the device 5 and hence also the sealing stopper 56. Alternatively, a connecting element such as a snap-fit seal may be provided in the region of the contact surface between the sealing stopper 56 and the external wall of the neck of the container 6, as illustrated in FIG. 7, for example.

As the device 5 is pushed onto the neck of the container 6, the sealing element 66 is pierced by means of the septum 13 inserted in the sealing stopper 56, thereby enabling the flow passage 38 of the device 5 to establish the flow connection between the interiors 23, 24 of the containers 1, 6 once the septum 13 has pierced the sealing stopper 56.

Once the liquid has been transferred, the container 1 incorporating the device 5 is pulled off, leaving the sealing stopper 56 behind on the container 6, which is thus tightly sealed, ready for other method steps.

Naturally, it would also be possible to use other types of connecting devices with this embodiment of the device 5, for example bayonet fittings, etc. However, care should be taken to ensure that the sealing stopper 56 is not secured so tightly in the device 5 that it is pulled off the container 6 when the device 5 is removed.

In the embodiment illustrated in FIG. 8, the flow passage 38 is retained so that it can slide in the device 5 along the longitudinal mid-axis 41. To this end, the flow passage 38 may be secured by a retaining means 67, e.g. a perforated disc with a central orifice for the flow passage 38. In the initial position, at least certain regions of this retaining means 67 preferably sit on an annular projection 69 disposed on an internal circumference 68 of the device 5 extending out from the internal surface of the device 5 directed towards the flow passage 38, so that the septum 13 is not pierced by the flow passage 38 in this initial position. When the container 1 is pushed into the connecting region 26 of the device 5, the screw cap 2 comes into contact with the retaining means 67 which is pushed over the projection 69 in the direction towards the interior 24 of the container 6. To this end, the retaining means 67 may be made from an elastic material in order to reduce the force needed to push on and deform the retaining means 67. The annular web 37 of the screw cap 2 can then also be pushed over the projection 69 in the direction towards the interior 24 so that the screw cap 2 latches between the sealing stopper 56 and the projection 69 and is thus secured. As a result of this fixed arrangement, when the container 1 is pulled off, the device 5 establishing the flow connection is simultaneously pulled off the container 6.

Another option with this embodiment is for the flow passage 38 to be screwed into the retaining means 67 and the retaining element 67 may naturally be injection moulded onto the flow passage 38 or the flow passage 38 adhered to the retaining means 67, etc.

As a result of a slight modification to the embodiment of the analysis kit 22 illustrated in FIG. 8, the sealing stopper 56 may be already mounted on the container 6, in which case the device 5 then has to be pushed past the sealing stopper 56.

FIG. 9 illustrates another variant of the analysis kit 22, in which a shut-off element 70 is preferably disposed in the neck of the containers 6, e.g. a valve, a plug valve or similar. The device 5 used to connect the interior 23 of the container 1 with the interior 24 of the container 6 in this embodiment of the device 5 does not have the latching system on the neck of the container 6 in the connecting region 25 for the container 6 and instead at least a part of the device 5, i.e. the connecting region 25, locates in a recess 71 in the neck of the container 6. In order to fix the device 5 on the neck of the container 6, this recess may be provided with a snap-fit system, a screw connection, a bayonet fitting, a friction lock, etc., for example.

When the device 5 is placed on the neck of the container 6, the flow passage 38 is inserted through an orifice 72 preferably disposed centrally in the neck of the container 6. Although the end of the flow passage 38 facing the orifice 72 is designed to pierce a septum in FIG. 9, this need not necessarily be the case in this embodiment because it may be that this variant does not have a septum which has to be pierced on the container 6. However, as indicated by broken lines in FIG. 9, the shut-off element 70 may be disposed within the extension of the flow passage 38, in which case it may be useful or necessary to provide a septum on the container 6. If this is the case, both ends of the flow passage 38 are designed to pierce a septum, as illustrated in FIG. 9.

The flow connection between the interiors 23, 24 of the containers 1, 6 can be shut off at any time with the aid of the shut-off element 70. Consequently, any desired quantities can be transferred from container 1 to container 6 and if the intention is for reactions to take place in the container 6, the shut-off element 70 can be set so that the liquid from container 1 is added slowly, e.g. in drops, to container 6, in which case it may be of advantage to interrupt the flow connection between these two containers until the liquid already transferred to the container 6 has finished reacting. The shut-off element 70 may have a rotatable passage which can be linked to the flow passage 38 to establish a flow connection. This being the case, the flow passage 38 may be of a two-part design with a respective flow passage part (not illustrated in FIG. 9) disposed respectively in one of the containers 1, 6.

In the embodiment of the device 5 which has another connecting region for another container, this sealing element may be provided in the form of a 3-way plug valve, for example, so that a flow connection is set up selectively either from container 1 or the other container to container 6 or all three containers can be made to communicate with one another simultaneously via this shut-off element 70.

In this embodiment of the device 5 used to establish a flow connection between several containers, both container 1 and container 6 may have a graduation markings on an internal and external surface, thereby making it possible to gain a rough estimate of the volume already transferred from container 1 into container 6. Naturally, any other types of graduation markings of this type may be provided on the containers as desired.

As indicated by broken lines in FIG. 9, the neck of the container 6, in particular the orifice 72, may be secured by a sealing cap 73, e.g. a screw cap, for transportation purposes.

Figure 10:
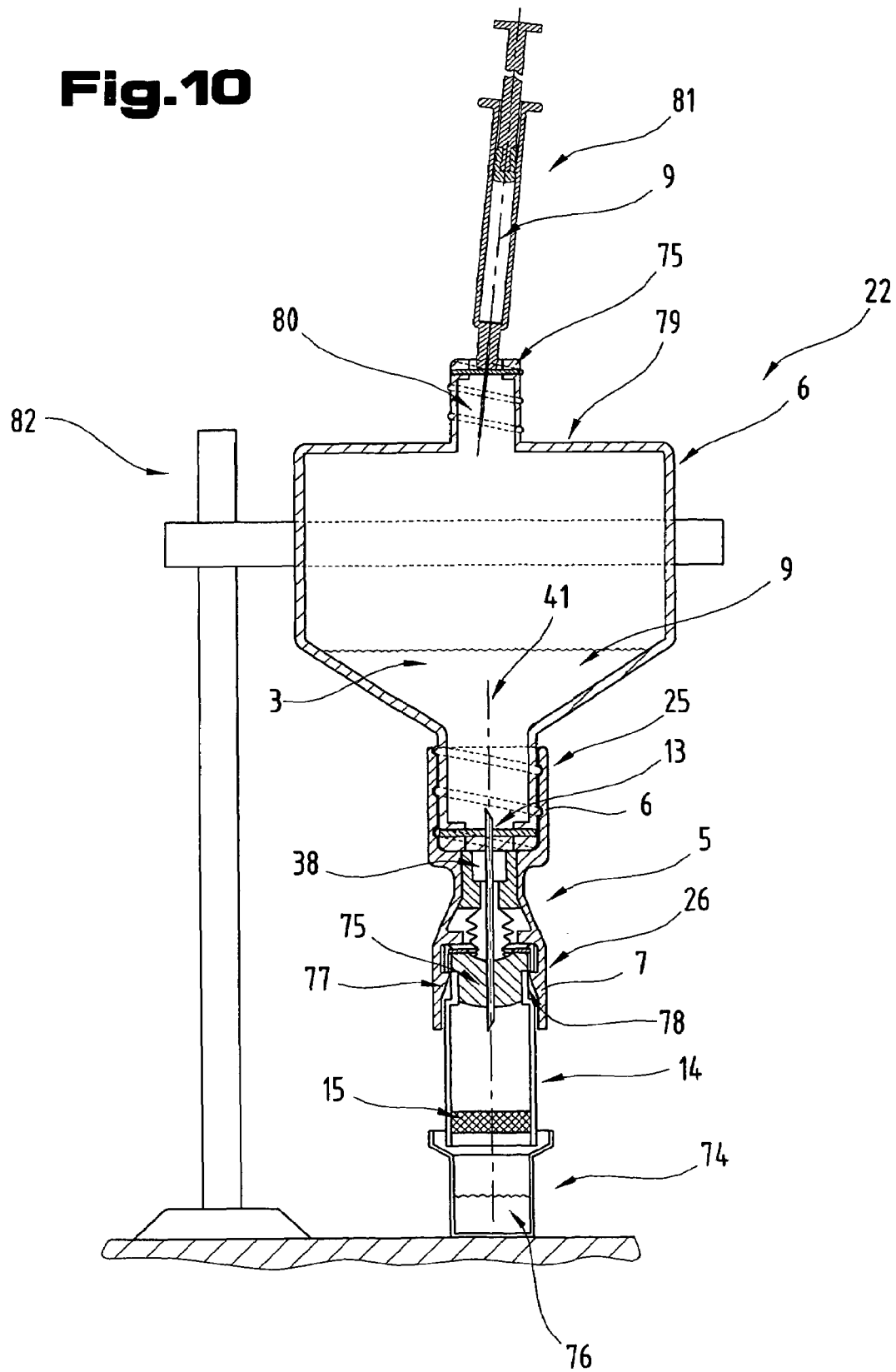
FIG. 10 shows an analysis kit for separating at least one component from a sample, consisting of a container, a purification system incorporating a matrix, a catchment vessel and a device for connecting the container to the purification system.

FIG. 10 illustrates an embodiment of the analysis kit 22, comprising the container 6, a device 5 for establishing a flow connection, the purification device 14 containing a matrix 15 and a catchment container 74. This analysis kit 22 may be used to process samples that have already been prepared and the target substance separated on the matrix 15. It should be pointed out at this stage, however, that the embodiments of the analysis kit 22 described above may be combined elements of this embodiment as well as others that will be described below.

As already mentioned, the purification device 14, e.g. the purification column, is preferably cylindrical in shape with open ends. Consequently, there is no need to provide a septum 75 in at least one of the end regions of the purification device, although such a septum 75 could be used to fix and guide the device 5, especially its flow passage 38. However, it is also possible for the purification device 14 to be inserted in the connecting region 26 of the device 5, in particular for receiving the container 1 described in earlier embodiments above, where it can be secured by various retaining mechanisms or connection systems, such as a screw connection or bayonet fitting, for example, or it may simply be retained by means of a friction lock between the wall of the purification device 14 and the device 5.

The other connecting region 25 for the container 6 is of the same design as that described in connection with the embodiments illustrated in FIGS. 2 to 9.

The options listed above, for example a screw connection, bayonet fitting, friction lock, catch mechanisms, etc., may be used to connect the catchment container 74 to the end region of the purification device 14 with which it co-operates. The capacity of this catchment container 74 is such that it will preferably hold the entire contents of the container 6, in other words the transferred original sample 3, as well as the reagent or reagent mixture 9 or resultant reaction mixture in the container 6. Another possibility however, especially as one or more washing steps may be necessary to separate the target substance(s) on the matrix, is for this catchment container 74 to have a correspondingly larger capacity, thereby obviating the need to replace this container 74 between the individual method steps.

As mentioned above in respect of FIG. 1, when the container 1 incorporating the device 5 has been removed from the container 6 to which the original sample 3 was transferred, the latter can be fitted with an as yet unused device 5 for establishing a flow connection between two containers and then connected to this purification device 14.

By pivoting the device assembled in this manner by 180° so that the device is upside down, the liquid mixture enclosed in the container 6 drains through the flow passage 38 and then through the matrix 15 of the purification device 14 into the catchment container 74. Consequently, the target substance or target substances are retained on the matrix 15 and thus separated from the residual liquid 76.

Providing the flow passage 38 has been found to be of advantage in view of the fact that nucleic acid molecules, for example, need to be fragmented, because this fragmentation can be initiated by the small diameter of the flow passage 38, which may be provided in the form of a two-way needle or as a cannula. If no such fragmentation is necessary, the flow passage 38 may naturally be dispensed with, in which case the purification device 14 can be connected to the container 6 by means of an at least substantially cylindrical-shaped device 5 in order to establish the flow connection.

However, it is of advantage if the device 5 used to establish the flow connection is of the same type as the devices 5 described in connection with FIGS. 2 to 9, i.e. this device 5 can be used to establish the flow connection between the two containers 1, 6 on the one hand, and to establish the flow connection between the container 6 and the purification device 14 on the other. This makes the device 5 easier to manufacture and in particular provides an analysis kit 22 that can be used universally.

In another variant of the device 5 for establishing the flow connection, a snap-fit seal, in particular one which can be removed, is provided in the connecting region 26 for the purification device 14, in which case an annular projection 77 standing proud of the internal surface of the device 5 in the connecting region 26 locates in a matching recess 78 in the wall of the washing device 14 in the region where it connects to the device 5. This recess 78 may be achieved by a reduction in the cross section of the purification device 14 in this region, for example.

As also illustrated in FIG. 10, the container 6 may have another container opening 80, in particular on a base region 79 opposite the neck of the container 6 in the direction of the longitudinal mid-axis 41, which serves as a support surface for the container 6 in the embodiments of the analysis kit 22 illustrated in the previous drawings, e.g. in the form of a neck, which may optionally be closed off by another septum 75. As a result, another container can be connected to this container opening 80, in order to transfer a washing fluid through the container 6 to the purification device 14 for example, in order to wash out any residues of the sample fluid left behind in the container 6 with the washing liquid.

A syringe 81 is used for this purpose instead in FIG. 10, which can naturally also be used to introduce other reagents 9, especially if the container orifice is sealed by means of the septum.

Conversely, on the other hand, pre-definable volumes may also be drawn off from the container 6 via this additional container opening whilst a reaction is taking place in it, e.g. for quality control purposes.

Although the analysis kit 22 illustrated in FIG. 10 is held by a retaining device 82, e.g. a retort, this analysis kit 22 may also be introduced into a centrifuge vessel as described in connection with FIG. 1, in which case the catchment container 74 can be dispensed with because its function will be fulfilled by the centrifuge vessel.

The sample fluid may be transferred via the matrix 15 to the catchment container by centrifugation as described above or, alternatively, various forces could be applied to the fluid, such as compression forces for example.

If the container 6 is fitted with the septum 13, for example the container 6 used for the reaction stage described above, e.g. is from the analysis kit 2 described in connection with FIGS. 2 to 9, a device 5 may be used to establish the flow connection which has a flow passage 38 of which only one end has a system for piercing the septum 13 or is designed for this specific purpose.

The matrix 15 may be such that it is capable of bonding with nucleic acids or proteins. This being the case, it may be provided in the form of a silicate in the manner of a filter disc.

Instead of the matrix 15, it would naturally also be possible to use other means for separating or isolating at least one target substance from the sample fluid. These means might also include a liquid, for example, or may be in the form of a chromatography column, in which case several target substances can be eluted one after the other.

Figure 11:
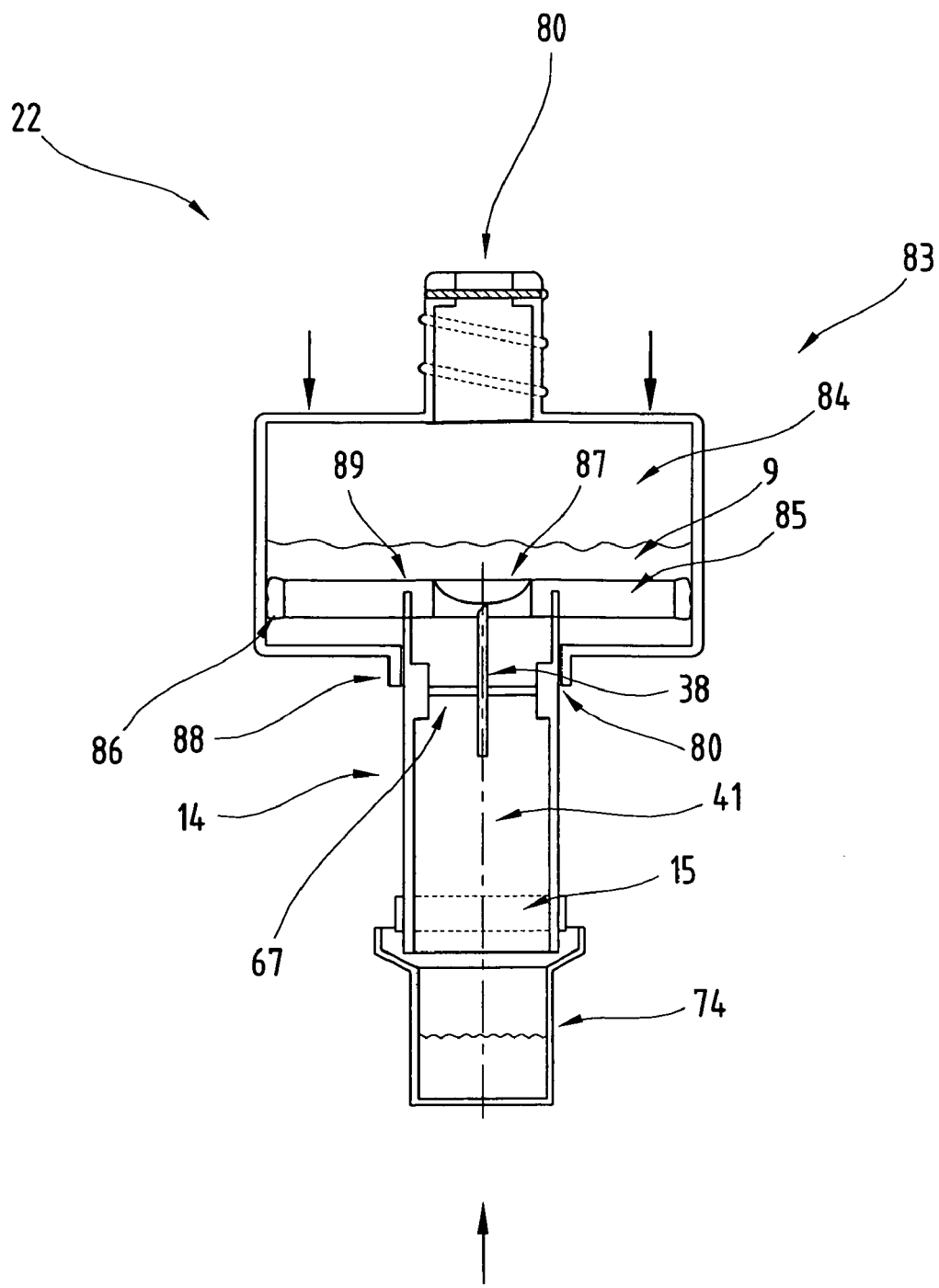
FIG. 11 shows another embodiment of the analysis kit.

FIG. 11 illustrates a container 83 which may be used in the analysis kit 22 proposed by the invention. The container 83 again has container openings 80 lying opposite one another along the longitudinal mid-axis 41. The purification device 14 is inserted in one of the two container openings 80. A catchment container 74 may also be provided in the end region of the washing device 14 lying opposite these container openings 80 along the longitudinal mid-axis 41.

A plunger 85 is disposed in an interior 84 of the container 83, which is able to slide along the longitudinal mid-axis 41 and in particular is designed to be mounted in a sealed arrangement relative to the internal wall of the container 83 perpendicular to the longitudinal mid-axis by means of a sealing element 86. Consequently, when the plunger 85 slides along the longitudinal mid-axis 41, a part volume of the container 83 underneath directed towards the purification device 14 is not filled with the sample fluid above the plunger 85.

A self-closing septum 85 is disposed in the plunger 85, preferably at the centre, which can be pierced by the flow passage 38 disposed underneath.

The washing device 14 is cylindrical in shape and is inserted through an annular web 88 provided on the container 84 in the region of the orifice 80 for receiving the purification device 14. This permits a relative displacement of the container 84 with respect to the washing device 14.

In an initial position, the plunger 85 is disposed in the region of the opening 80 for the purification device 14.

In order to establish the flow connection, the purification device 14 is inserted in an annular gap 89 disposed in the plunger 85 in the region of the end face of the purification device 14 facing the interior 84, causing the flow passage 38 to pierce the septum 87 and thus set up the flow connection to the interior 83. This plunger 85 can then be pushed farther in the direction towards the container opening 80 opposite the purification device 14, thereby exerting a corresponding pressure on a sample fluid enclosed in the interior 84 of the container 83, which then drains through the flow passage 38 into the purification device 14 in order to separate the target substance(s) on the matrix 15.

The flow passage 38 is retained so that it is immobilised by the retaining means 67 in the top end region of the purification device 14 facing the opening 80 of the container 84, in the interior thereof.

Another reagent or reagent mixture 9 may be introduced into the interior 84 of the container 83 through the opening 80. If necessary or desirable, another possibility is for the container 84 to have only one container opening 80 for connecting the purification device 14.

The purification device 14 could also be connected to the plunger 85 of the container 83 by means of a tear-off point which breaks when pressure is applied to the container 83 and the purification device 14, thereby causing the plunger 85 to pierce the septum 87 due to the relative displacement.

With this embodiment, especially if working with sample fluids which permit a transfer of fluid purely by force of gravity, quantities of fluid which can be specifically determined can be transferred to the purification device 14 by applying pressure accordingly. This being the case, the capacity of the purification device 14 may be reduced and the sample fluid transferred in portions through this purification device 14.

Furthermore, the plunger 85 may diverge to a point or beak-like arrangement in the direction towards the longitudinal mid-axis 41, for example to enable the container 83 to be at least almost totally emptied.

Figure 13:
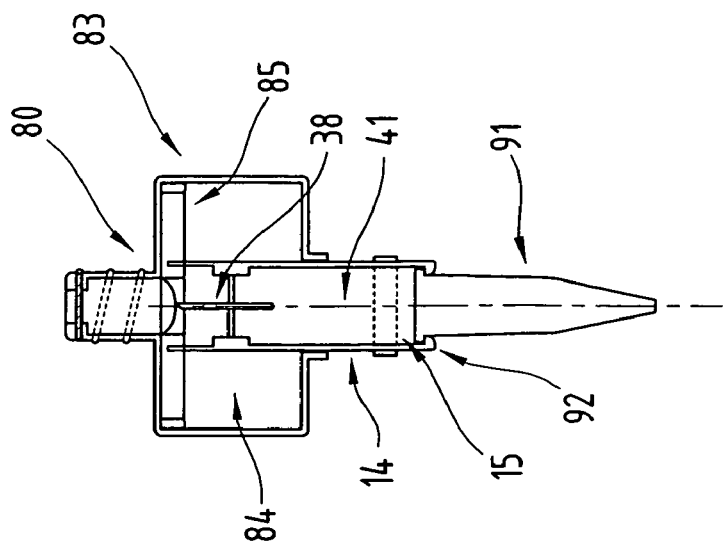
FIG. 13 shows another embodiment of the analysis kit illustrated in FIG. 10.
Figure 12:
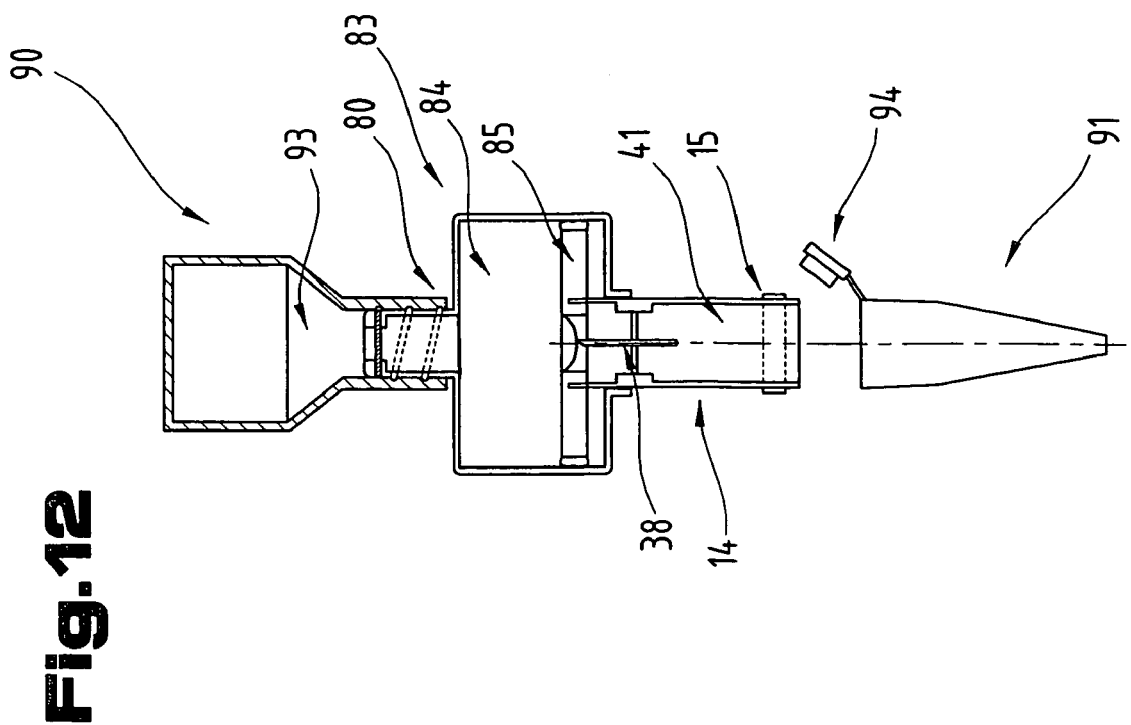
FIG. 12 shows another embodiment of the analysis kit illustrated in FIG. 10.

FIGS. 12 and 13 illustrate other embodiments and variants of the embodiment of the analysis kit 22 illustrated in FIG. 11, in which the second container opening 80 disposed on the container 83 lying opposite the purification device 14 on the longitudinal mid-axis 41 is connected to a washing fluid container 90, e.g. is screwed to the container 83. Naturally, the flow connection between the washing fluid container 90 and the container 83 may be established by means of the device 5, which is not illustrated in FIGS. 12 and 13, used to connect two containers, and in particular incorporating the flow passage 83 in order to pierce septums.

The catchment container 74 in these embodiments is replaced by a centrifuge vessel 91, which may be pushed onto the purification device 14 (FIG. 12), for example, or clipped in with the aid of an annular web 92 (FIG. 13). With these embodiments, the plunger 85 of the container 83 may be returned to its initial position, as a result of which a corresponding vacuum pressure is created in the interior 84 so that a washing fluid 93 is sucked into this interior 84. Once the flow connection to the washing fluid container 90 has been interrupted, for example by pulling the washing fluid container 90 off the container 83 or with the aid of a shut-off element 70 described above, the washing fluid 93 can be transferred through the flow passage 38 into the purification device 14 and through the matrix 15 by means of the opposing displacement of the plunger 85.

Instead of the washing fluid container 90, other containers could naturally also be connected to this top container opening without the device 5, for example containers enclosing elution fluids, so that the target substance(s) can ultimately be eluted from the matrix and transferred into the centrifuge vessel 91 within a closed system.

To enable the eluted target substance(s) to be stored, the centrifuge vessel 91 may be provided with a sealing cap 94, as illustrated in FIG. 12. Instead of using the septum 87 in the plunger 85, it would naturally also be possible to use other sealing elements, e.g. flap valves, in which case the flow passage 38 need not be designed to pierce a septum but must merely be able to open this flap valve due to the relative displacement of the container 84 against the purification device 14.

Figure 14:
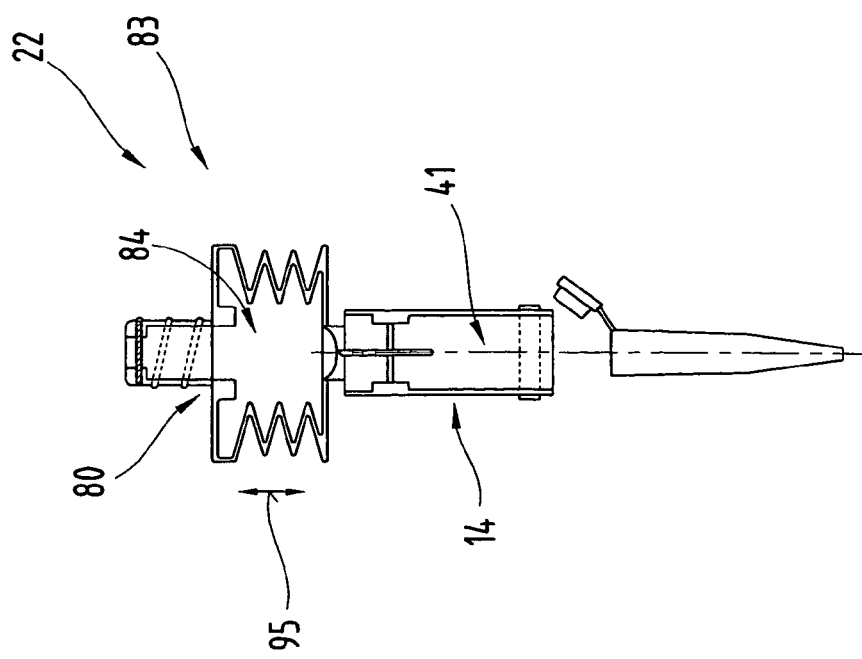
FIG. 14 shows another embodiment of the analysis kit illustrated in FIG. 10.

FIG. 14 illustrates another embodiment of the analysis kit 22 in which the container 83 is made from an elastically deformable material so that this container 83 can be pressed together as indicated by double arrow 95 in FIG. 14 in the direction towards the longitudinal mid-axis 41 in the form of a bellows. As a result, a corresponding pressure force is exerted on the interior 84 of the container 83, i.e. on the sample fluid contained in it, which reduces the volume, thereby facilitating the transfer to the purification device 14.

Again with this embodiment, it is not necessary for the container 83 to have a second container opening 80 at the end of the container 83 opposite the purification device 14.

Figure 15:
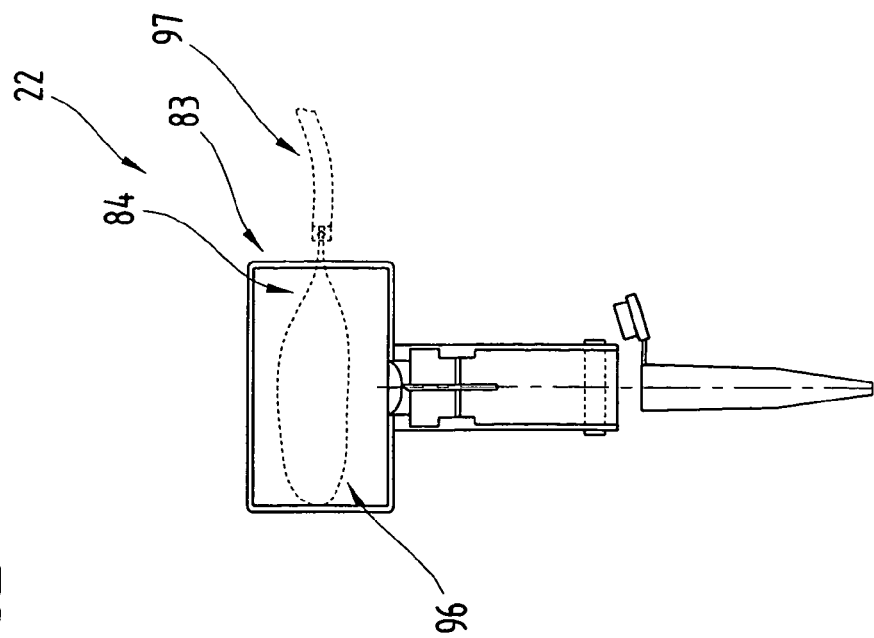
FIG. 15 shows another embodiment of the analysis kit illustrated in FIG. 10.

FIG. 15 illustrates an embodiment of the analysis kit 22 of the type shown in FIG. 11, in which a membrane 96 is disposed in the container 83 and connects with a supply line 97 for a gaseous fluid in particular outside the container 83. Yet again, the volume of the interior 84 of the container 83 can be reduced by providing the membrane in a balloon-type design and inflating this membrane. By alternately inflating and deflating the membrane, a change in pressure can be generated in the container 83 so that the reduction and expansion of the volume and the resultant pressure change provides a pump action, enabling the sample fluid enclosed in the container 83 to be transferred. Alternatively, the membrane 96 may also be inflated before filling the container 83 and then deflated, as a result of which a fluid can be delivered through another container opening 80, not illustrated, and sucked into the interior 84 of the container 83.

A valve system may naturally be provided in order to shut the membrane 96 off from the supply line 97.

Figure 16:
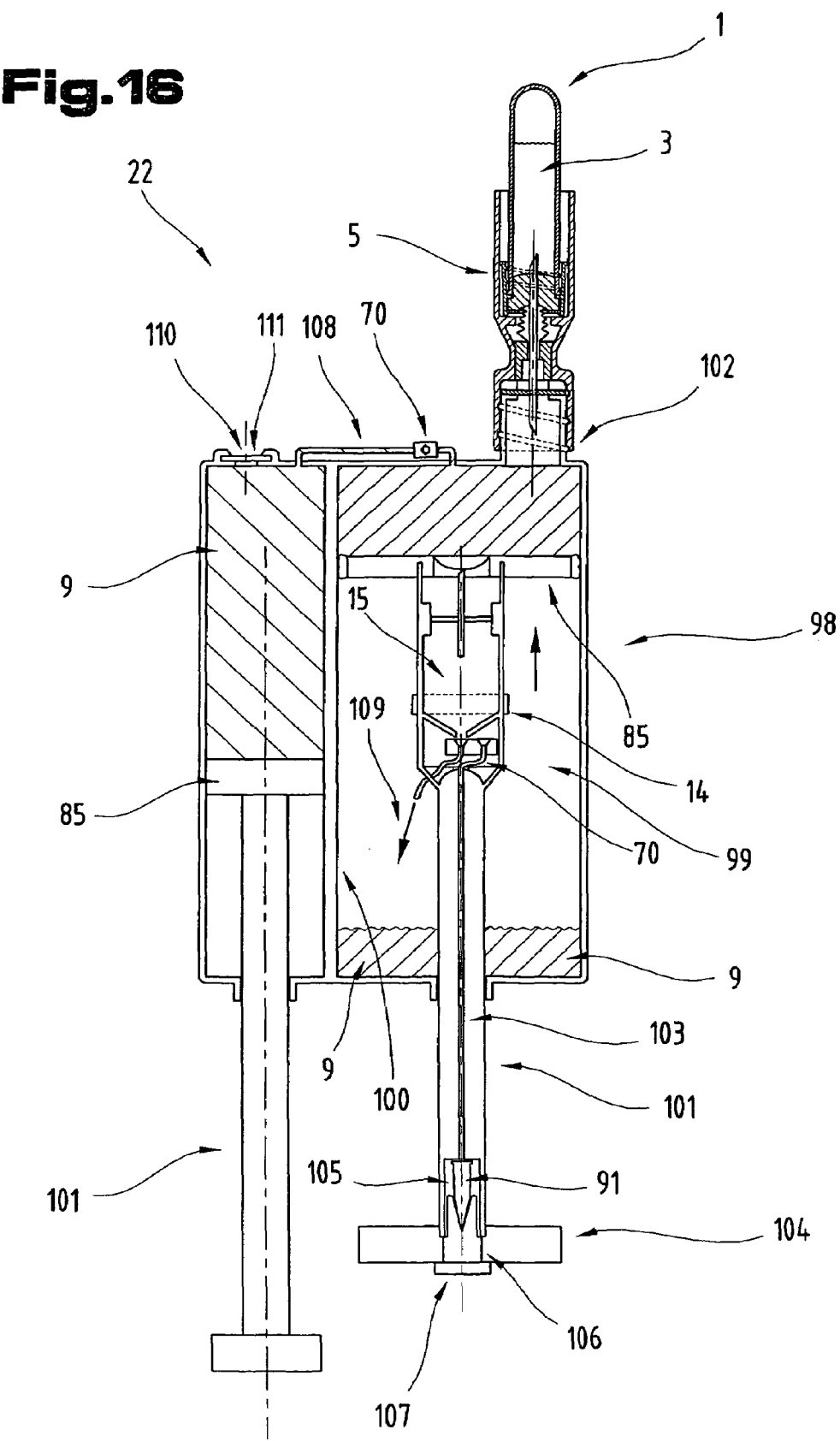
FIG. 16 shows an analysis kit with a container incorporating two part-volumes.

FIG. 16 illustrates a container 98 with a dividing wall 100 in its interior 99. The container 98 is therefore split into part-volumes, thereby enabling various reagents or reagent mixtures 9 to be placed inside a part-volume, whilst providing one part-volume as a reaction zone. The latter may also contain the plunger 85 with the connected purification device 14, forming part of a plunger rod 101.

On the wall of the container 98 surrounding the part-volume reserved for the reaction, a container opening 102 may be provided, in particular in the upper region, for example in the cover of the container 98, to which a device 5 for establishing a flow connection between containers can be attached, thereby setting up a flow connection to container 1 enclosing the original sample 3, which can then be transferred into the reaction area of the container 98. As mentioned above, a lysing buffer may be contained in this reaction area, thereby enabling nucleic acids to be released from the cells. A matrix 15 is also provided in the purification device 14.

The interior of the plunger rod 101 may also be provided with a passage 103, which may extend from the purification device 14 as far as a handle 104 in the end region of the plunger rod 101 opposite the purification device 14. The cross section of this passage 103 may be larger in the region of this handle 104, forming a chamber 105 which can be used to accommodate the centrifuge vessel 91. This being the case, the passage 103 opens into the opening of the centrifuge vessel 91.

In order to retain the centrifuge vessel 91, a chamber 106 may be provided in the handle 104, with a retaining element 107 for holding the centrifuge vessel 91, e.g. a stop.

The part-volumes may have a flow connection to a connecting passage 108, in which case a shut-off element 70 of the type described above may provided in this connecting passage 108 to shut off the flow connection between the part-volumes.

Naturally, the dividing wall 100 need not extend across an entire container height of the container 98, thereby enabling liquids to pass above the dividing wall between the part-volumes.

An operable adjusting and shut-off element 70 may be provided outside of the container 98 between the plunger rod 101 and the purification device 14 to enable a flow connection to be selectively established with the passage 103 or the volume of the reaction area underneath the plunger 85.

In this embodiment of the analysis kit 22 and the container 98, the original sample 3 is transferred to the part-volume of the container 98 reserved for the reaction in a first method step. Once the reaction has taken place, for example nucleic acids have been released, the plunger rod is moved in the direction towards the interior 99 of the container 98, so that the volume of the interior 99 of the container 98 above the plunger 85 is reduced and the sample fluid transferred to the purification device 14 as a result. The shut-off element 70 of the purification device 14 is thus in a position in which the excess fluid is transferred into the volume created underneath the plunger 85 when the plunger 85 is pushed as indicated by arrow 109. Once the target substance(s) has or have been transferred and bonded on the matrix 15, the plunger 85 can be returned in at least certain regions in the direction of its initial position. A reagent 9, e.g. a washing fluid or an elution fluid, contained in a part-volume which is also fitted with a plunger 85 incorporating a plunger rod 101, is transferred out of this part-volume by reducing the volume of the part-volume, via the connecting passage 108 into the reaction area and fed through the matrix 15. Depending on whether a washing fluid or an elution fluid is used, the shut-off element 70 of the purification device 14 provides a flow connection to the passage 103 to feed the eluate into the centrifuge vessel 91 or a flow connection is established to the interior 99 of the container 98 in the area of the reaction zone.

Consequently, the sample can be virtually fully prepared in readiness for analysis of the target substance(s) within a closed system to which a range of different containers 1 can be connected via the device 5.

In the situation where another reagent has to be transferred into the part-volume with the washing or elution fluid and the respective fluid occupies only a small volume, this part-volume may have a container opening 111 fitted with a septum 110.

Figure 17:
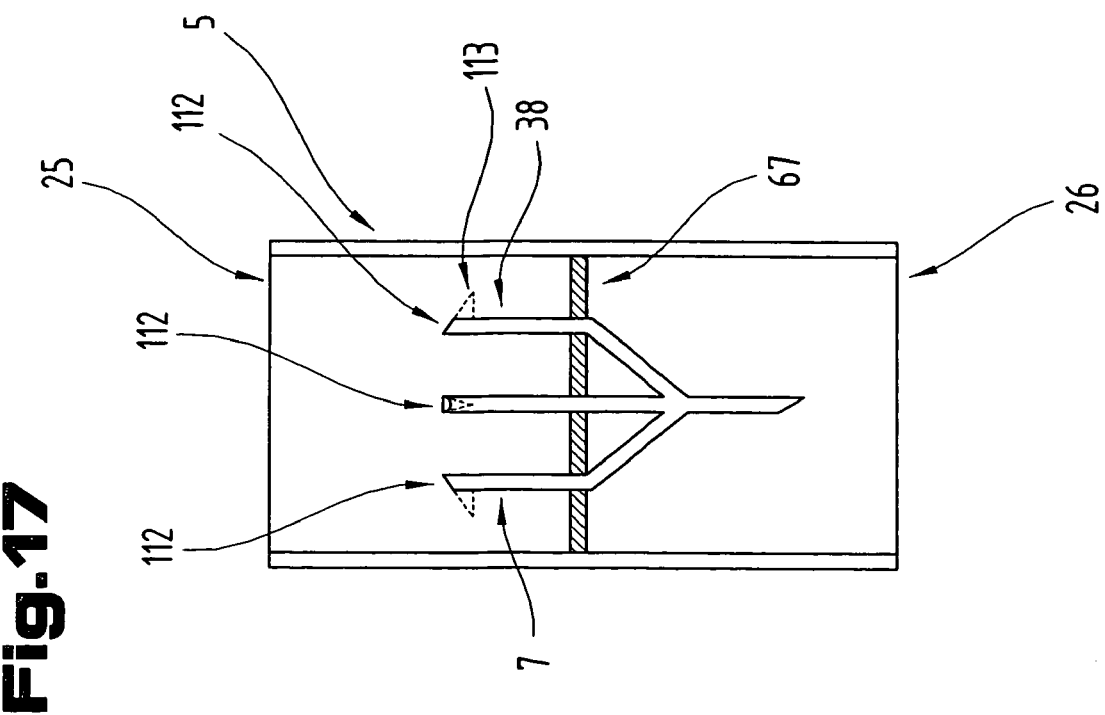
FIG. 17 depicts a different embodiment of the device for establishing a closed, airtight connection between two containers.

FIG. 17 illustrates a variant of the device 5 for establishing a flow connection between several containers. This device 5 may also be of a cylindrical design with two oppositely lying connecting regions 25, 26 for the containers.

Unlike the flow passages 38 described so far, the flow passage 38 of this embodiment has several part-flow passages 112 in at least one of the connecting regions 25, 26. As illustrated in FIG. 17, these part-flow passages 112 may be grouped to form a single flow passage 38 at the second connecting region 26. Naturally, it would also be possible for these part-flow passages 112 to extend into the second connecting region 26 separately.

The flow passage 38 and the part-flow passages 112 are also retained in the device 5 by means of the retaining means 67 in this embodiment.

The multiple piercing action means on the one hand that the sample fluid drains more rapidly out of the container 1 (not illustrated in FIG. 17) in this connection region 25 and on the other hand that the septum of the container 1 has a stronger retaining force as it now has to be pierced by several piercing means 7. In addition, as illustrated in FIG. 17, a retention system 113, e.g. in the form of a barb, is provided on the flow passage 38 and the part-flow passages 112 in the region of the piercing means 7, so that once the septum 28 of the container 1 (not illustrated in FIG. 17) has been pierced, there is greater resistance to the container 1 being pulled off the device 5.

Naturally, these retention means 113 may also be used with the other embodiments of the flow passages.

Figure 18:
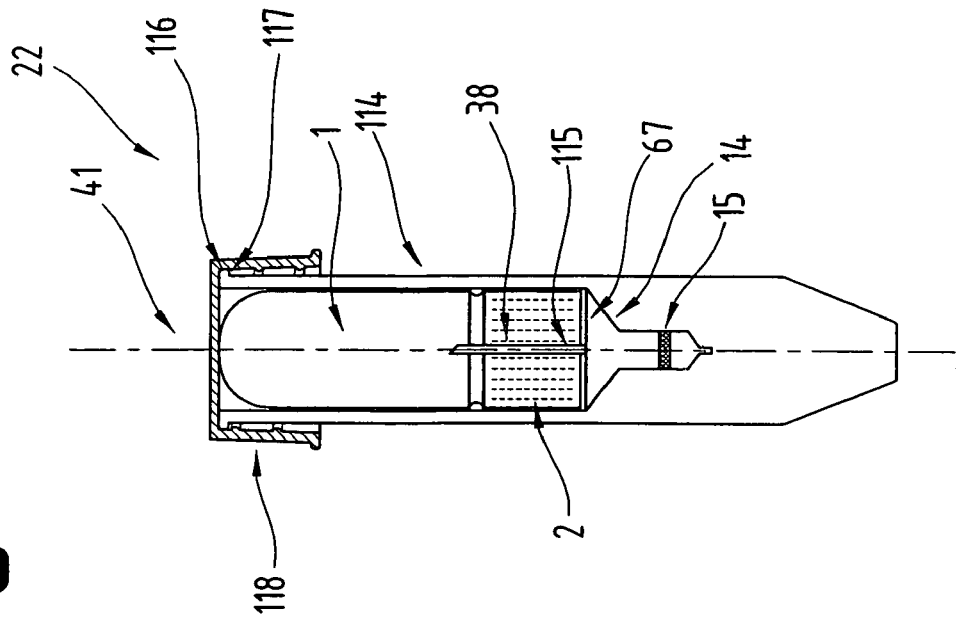
FIG. 18 shows another embodiment of the analysis kit for separating at least one component from a sample, in particular for centrifuges.

FIG. 18 illustrates an embodiment of the analysis kit 22 which is designed for separating the target substance(s) by means of centrifugal force. To this end, a purification device 14 containing a matrix 15 is inserted in a centrifuge vessel 114, this purification device 14 incorporating a flow passage 38 which is designed to pierce a container seal 115. The container 1 or 6 is inserted in the purification device 14 with the screw cap 2 pointing towards the matrix 15 so that the septum of the container 1, 6, not illustrated, is pierced by the flow passage 38.

In order to secure the purification device 14, it may have an annular web 116 in the end region lying opposite the matrix 15 extending away from the latter in the direction perpendicular to the longitudinal mid-axis 41, which sits on a similarly designed web 117 of the centrifuge vessel 114.

Optionally, the centrifuge vessel 114 may also be sealed by means of a sealing device, e.g. by a screw cap 118.

As explained above, the sample fluid is transferred from the containers 1, 6 through the matrix 15 of the purification device 14 into the centrifuge vessel 14 during centrifugation.

The flow passage 38 may be secured in the purification device. 14 by a retaining means 67 which is star-shaped as seen in plan view.

In all the variants, the flow passage 38 may be secured in an initial position in the middle region 27 between the two connecting regions 25, 26 of the device 5 for establishing a flow connection between several containers by means of one or more locking devices. The flow passage 38 is not displaced in the direction towards the longitudinal mid-axis, enabling the septums 13, 28 to be pierced, until this locking device has been released. This releasing action may be operated by pushing the container 1 into the connecting region 25 of the device 5, causing a release once contact is made with the flow passage 38 and/or the retaining means 77.

An additional sealing element, for example a sealing ring, may also be provided in at least one of the two connecting regions 25, 26 for the containers 1, 6 which, in addition to improving the seal also enhances the retaining force by which the containers 1, 6 are secured in this connecting region 25, 26, due to increased friction force.

The device 5 for establishing a flow connection between several containers may also be of a two-piece design, in which case these two pieces may be joined to one another by means of a releasable connection. This releasable connection might be a screw connection, a bayonet fitting, a friction lock or similar, for example.

As illustrated in FIG. 19, a container 119 proposed by the invention may have a container base 120 and a container wall 121 at least partially surrounding an interior 122, and the container wall 121 has an inlet orifice 23 which is preferably disposed opposite the container base 120 in the direction of a container longitudinal mid-axis 124, and a device 125 for establishing a closed airtight connection to another container is disposed in the region of the inlet orifice 123. This device 125 may also have a retaining means 126, which is secured in a device wall 127 which is also specifically cylindrical in shape or is integral therewith. The purpose of the retaining means 126 is to secure a flow passage 128, which is covered by a protective cap 129 made from an elastic, self-closing material and which may have a piercing means 130. A length of the device wall in the direction of the longitudinal mid-axis 124 is preferably such that the flow passage 128 incorporating the piercing means 130 is laterally covered by this device wall 127.

Within the contour of the device wall 127, at least one retaining element 131, for example a catch mechanism, etc., may project out from an internal surface of this device wall 127 in the direction towards the longitudinal mid-axis 124.

Furthermore, as indicated by broken lines in FIG. 19, a connecting region 132 may be closed off by means of a sealing device 133, e.g. a cap, such as a screw cap.

The other container can be releasably attached to the device 125 by means of a screw connection, a bayonet fitting or similar, in this embodiment.

Generally speaking, it should be pointed out at this stage that the container 119 and/or the device 125 for establishing a flow connection with another container, in keeping with the explanations given above in respect of the device 5, may be used to establish a flow connection to several containers and may constitute these containers 1, 6, and the device 125 does not have a second connecting region for understandable reasons.

Accordingly, the container base 120 and/or the container wall 121 has at least one other inlet orifice 123 incorporating a device 125 and this orifice 123 constitutes the device 125.

Likewise, the container base 120 and/or the container wall 121 is of an elastically deformable design so that the volume of the container 119 can be controlled by increasing or reducing pressure accordingly.

Likewise, the container base 120 may also have a plunger which sits in a liquid tight fit and, again, can be used to obtain a reduction in volume. Various reagents or reagent mixtures, e.g. lysing buffers, elution fluids or similar, may naturally be placed in this container 119, as explained above.

Furthermore, at least one dividing wall may be provided in the interior 122 in order to divide this interior 122 into several part-volumes. Accordingly, the explanations given in respect of FIG. 17 apply here.

The plunger may be designed so that it can be locked in at least one of its end positions. It may also be provided with various shut-off elements 70, such as valves, plug valves or similar, to enable flow connections to be shut off between containers which can be attached to the container 119 or between the part-volumes in the interior 122.

At least one other opening, sealed off by a septum, may be provided in the container base 120 and/or in the container wall 121.

At least one membrane, for example an air bellows, may also be provided in the interior 122.

The flow passage 128 may in turn be provided in the form of a hollow needle incorporating a piercing means 138.

A cavity may also be provided to at least partially accommodate the protective cap 129 in the device 125.

The catch mechanism may be provided in the form of at least one recess or indentation in the internal surface of the device 125 or projecting out from it.

The interior 122 may also be evacuated, in which case the vacuum pressure may be such that a specific volume of fluid is sucked out of the container attached to the device 125 into the container 119.

If other devices 125 are attached to or constitute the container wall 121 and/or the container base 120, closure elements may naturally also be provided as a means of shutting off the flow connection.

Finally, a pressure-compensating passage may also be provided adjacent to or in the flow passage 128, as described above.

In all the embodiments described so far, the connection between the device 5, 125 for establishing a flow connection between the containers may also be obtained by other means not described above. For example, the individual parts may be coupled with one another by means of a magnetic or magnetisable material, for example ferromagnetic materials.

If using containers which hold a bigger quantity of reagent or reagent mixture 9 than the amount needed for a method step, these containers may be provided with a metering system. This might take the form of a cylinder which is placed on this container and a ball bearing is disposed in the container to close off a connecting passage to the cylinder and does not release it until the container is rotated by 1800 for example. It would naturally also be possible to use other types of metering systems.

All the parts of the individual devices may be made from plastic and it would also be possible to use a combination of materials, e.g. plastic/metal.

As mentioned above, if separating nucleic acids, it is of advantage if the diameter of the flow passage 38, 128 has a specific diameter conducive to fragmenting the nucleic acids.

The analysis kit 22 may also incorporate a container for holding a sample, e.g. a blood sample tube as described above. It may already contain reagents 9, as mentioned above, such as a lysing buffer, a preservative buffer or mixtures thereof, for example.

FIG. 20 illustrates a device 134 for cutting a sample of biological origin 135 into smaller pieces. This device 134 comprises a container 136 with an interior 137, which is at least partially bounded by a container wall 138. A container orifice 139 is closed off by a container seal 140, e.g. in the form of a screw cap with a thread 141.

At least one cutting device 142, e.g. a blade and preferably several of them, is provided in the interior 137, in particular attached to an internal wall surface 143 of the container wall 138 or a container base 144.

This cutting device 142 may be adhered to or moulded onto the container wall 138 and/or container base 144, for example during the manufacturing process when the container 136 is placed in the mould and then injected on.

Alternatively, this cutting device 142 may also be made from plastic and be of an integral design with the container 136.

The container 136 is in the form of a centrifuge vessel, preferably of a standard size, and may be placed on a centrifuge. As a result of the high rotary speed which can be transmitted to the container 136 by the centrifuge, the sample 135 is displaced past the stationary cutting devices 142 and cut into smaller pieces accordingly so that it can be homogenised with a desired fluid 145, e.g. a reagent or reagent mixture, placed in the interior 137 beforehand. The fluid 145 may be a lysing buffer and/or a preservative buffer, for example, as described above. Other fluids may also be used, such as alcohol solutions, etc., or alternatively distilled water.

The container seal 140 may be provided in the form of a septum which may optionally be secured in a screw cap, so that the homogenised sample can be transferred to another container by means of the device 5, 125 (see FIG. 2 and 19) used to a establish a flow connection between containers, for example. Consequently, the fluid 145 might be a lysing buffer, for example, and the sample 135 might be a tissue sample. During the process of cutting up the tissue sample and also in the case of cells, nucleic acids and proteins are released and can be lysed or preserved immediately. As described above, these nucleic acids can then be transferred via the device 5, 125 to a purification device, described above, where these nucleic acids can be separated.

Figure 21:
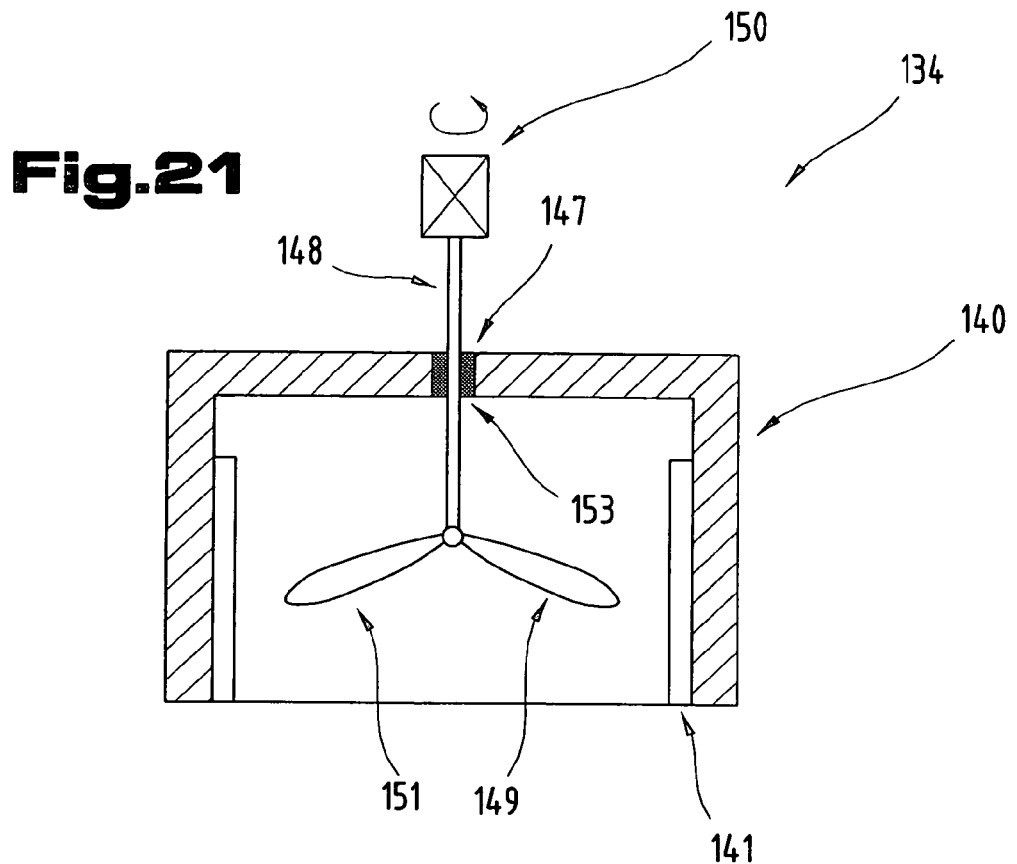
FIG. 21 depicts a device for cutting up a sample of biological origin in the form of a seal system.
Figure 22:
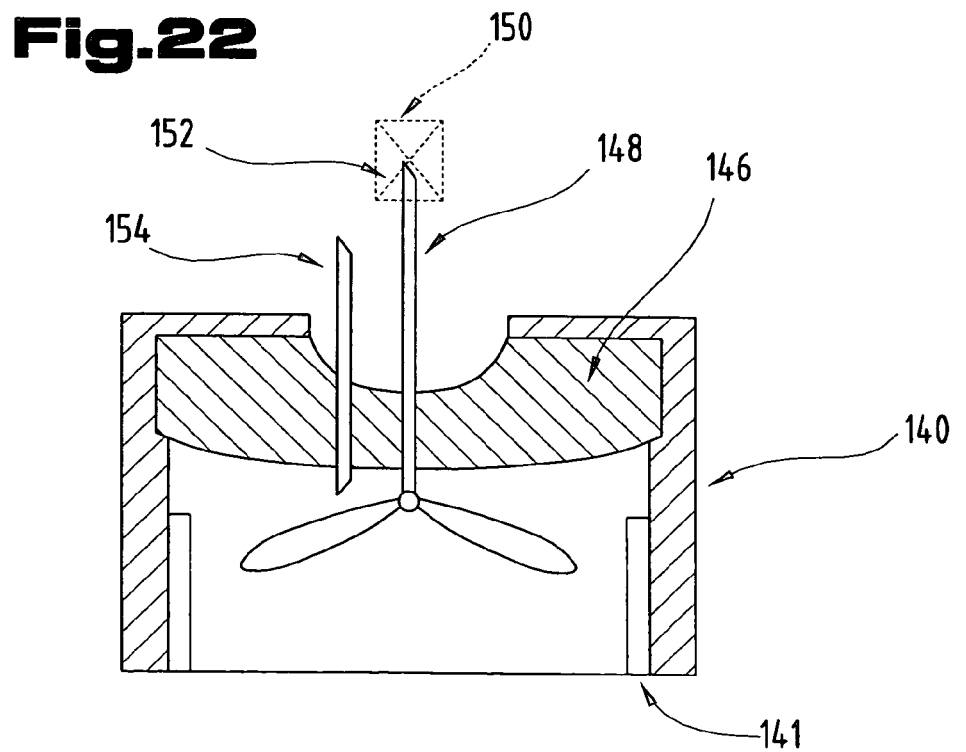
FIG. 22 is another embodiment of the device for cutting up a sample of biological origin illustrated in FIG. 21.

Alternatively or in addition, FIGS. 21 and 22 illustrate embodiments of the device 134 used for cutting a sample of biological origin into smaller pieces, in which case this device is provided in the form of the container seal 140, which may be a screw cap with a thread 141 (FIG. 21) or a screw cap with a thread 141 and a septum 146 (FIG. 22). In the case of the former variant of this device 134 illustrated in FIG. 21, a container seal orifice 147 is provided in the container seal 140, preferably at the centre of it, through which a drive shaft 148 for a moving blade system 149 is inserted and then connected to a drive unit 150 for the blade system 149, e.g. a motor. As a result of the rotating motion of the blade system 149 and the centrifugal force acting on it, blades 151 are moved out of their inactive position into an at least substantially horizontal position.

In the embodiment illustrated in FIG. 22, the drive shaft 148 is provided with a piercing means 152, which may be provided in the form of a needle-shaped tube converging to a point. In terms of the container seal 140, a known screw cap with a septum 146 may be used, in which case the drive shaft 148 may be used to pierce this septum 146, in other words is inserted by the user, and then connected to the drive unit 150 indicated by broken lines in FIG. 22. Accordingly, the device 140 may be sold in a modular design, so that the drive shaft 148 incorporating the blade system 149 may be used again, in which case it may be made of metal, for example, and can therefore be sterilised.

Naturally, this design may also be used for the device 140 illustrated in FIG. 21. In this case, the drive shaft 148 has a sealing element 153 and is inserted in the container seal 140. However, since this insertion process requires a certain amount of practice given that the devices 134 illustrated in FIGS. 21 and 22 are turned upside down, in other words with the container seal 140 pointing downwards, due to the fact that the sample enclosed in a container attached to the device 134 has to be able to pass into the region where the blade system 149 is disposed, it is necessary to ensure that an absolutely perfect seal is obtained in order to prevent any infectious material from leaking out of the device 134 and the container attached to it.

In the embodiment illustrated in FIG. 22, the drive shaft 148 can be used as the flow passage, especially if the drive shaft 148 is provided in the form of a hollow needle.

Alternatively, another possibility is to use a separate flow passage 154 through the septum 146 to transfer the cut and homogenised sample into this sample fluid or a flow connection to another container could be set up using the device 5, 125 proposed by the invention, as described above.

Another advantage of this device 134 is that because of its small dimensions—in practice, standard vessel sizes may be used, such as centrifuge vessels as described above, for example—nucleic acids or proteins can be homogenised and hence stabilised directly at the location where the tissue sample was taken, e.g. in the operating theatre, although this could also naturally take place subsequently in a processing laboratory.

It is preferable to use a drive unit 150 whose speed can be adjusted, thereby enabling the blade system 149 to be rotated at high speed.

The lysing buffer which may optionally be placed in the container or in the device 134 beforehand may be either in solid form or used as a liquid and in this respect, reference should be made to the explanations given above. The fact that this device 134 can be used directly at the site where the tissue sample is taken means that nucleic acids can be stabilised immediately and hence protected from deterioration due to endogenic or exogenic RNA.

The device 134 proposed by the invention which enables samples of biological origin such as tissue to be cut into smaller pieces and/or homogenised, simplifies operation of these devices in the field of molecular diagnostics and minimises the potential risk of the material becoming contaminated by foreign nucleic acids due to the closed system between containers.

In practical terms, tissue samples taken in the operating theatre can be cut with a scalpel or scissors and introduced directly into the device 134, which is preferably disposed in sterile packaging (naturally, all the individual parts of the analysis kit may likewise be disposed in sterile packaging) so that it can be placed in an isolating buffer. This device 134 is preferably used individually, once only, and need be opened and closed once only, thereby virtually ruling out any contamination by other tissue samples.

The devices proposed by the invention may be used for both manual applications and for automated or partially automated applications, e.g. in the laboratory, at least to a certain extent.

For the sake of good order, it should finally be pointed out that in order to provide a clearer understanding of the structure of the devices proposed by the invention and their constituent parts as well as the container proposed by the invention, they are illustrated to a certain extent out of proportion and/or on an enlarged scale and/or on a reduced scale.

The underlying objectives and the solutions proposed by the invention may be found in the description.

Above all, the individual embodiments of the subject matter illustrated in FIGS. 1; 2; 3; 4; 5; 6; 7; 8; 9; 10; 11; 12; 13; 14; 15; 16; 17; 18; 19; 20; 21; 22 may be construed as independent solutions proposed by the invention in their own right. The associated objectives and the solutions proposed by the invention may be found in the detailed descriptions of these drawings.

LIST OF REFERENCE NUMBERS

1 Container
2 Screw cap
3 Original sample
4 Double arrow
5 Device
6 Container
7 Piercing means
8 Double arrow
9 Reagent
10 Arrow
11 Arrow
12 Region
13 Septum
14 Purification device
15 Matrix
16 End region
17 Container
18 Base region
19 Curved arrow
20 Eluting agent
21 Container
22 Analysis kit
23 Interior
24 Interior
25 Connecting region
26 Connecting region
27 Middle region
28 Septum
29 Cylinder
30 Cylinder
31 Cylindrical wall
32 Cylindrical wall
33 Wall surface
34 Catch mechanism
35 Recess
36 Web
37 Annular web
38 Flow passage
39 Retaining mechanism
40 Recess
41 Longitudinal mid-axis
42 Tapered region
43 Cavity
44 Web
45 End face
46 Protective cap
47 Flow passage end region
48 Retaining element
49 Separating element
50 Separating element end region
51 Transition region
52 Groove
53 End region
54 Pressure-compensating passage
55 Liquid level
56 Sealing stopper
57 Stopper surface
58 Annular groove
59 Rubber element
60 Clamping element
61 Flow passage part
62 Flow passage part
63 Spring element
64 Locking device
65 Guide element
66 Sealing element
67 Retaining means
68 Circumference
69 Projection
70 Shut-off element
71 Recess
72 End-to-end orifice
73 Sealing cap
74 Catchment container
75 Septum
76 Residual fluid
77 Projection
78 Recess
79 Base region
80 Container opening
81 Syringe
82 Retaining device
83 Container
84 Interior
85 Plunger
86 Sealing element
87 Septum
88 Web
89 Annular gap
90 Washing fluid container
91 Centrifuge vessel
92 Web
93 Washing fluid
94 Sealing cap
95 Double arrow
96 Membrane
97 Supply line
98 Container
99 Interior
100 Dividing wall
101 Plunger rod
102 Container opening
103 Passage
104 Handle
105 Chamber
106 Chamber
107 Retaining element
108 Connecting passage
109 Arrow
110 Septum
111 Container opening
112 Part-flow passage
113 Retention system
114 Centrifuge vessel
115 Container seal
116 Web
117 Web
118 Screw cap
119 Container
120 Container base
121 Container wall
122 Interior
123 Inlet orifice
124 Container mid-axis 97 Supply line
98 Container
99 Interior
100 Dividing wall
101 Plunger rod
102 Container opening
103 Passage
104 Handle
105 Chamber
106 Chamber
107 Retaining element
108 Connecting passage
109 Arrow
110 Septum
111 Container opening
112 Part-flow passage
113 Retention system
114 Centrifbge vessel
115 Container seal
116 Web
117 Web
118 Screw cap
119 Container
120 Container base
121 Container wall
122 Interior
123 Met orifice
124 Container mid-axis
125 Device
126 Retaining means
127 Device wall
128 Flow passage
129 Protective cap
130 Piercing means
131 Retaining element
132 Connecting region
133 Sealing mechanism
134 Device
135 Sample
136 Container
137 Interior
138 Container wall
139 Container opening
140 Container seal
141 Thread
142 Cutting device
143 Wall surface
144 Container base
145 Fluid
146 Septum
147 Container seal orifice
148 drive shaft
149 blade system
150 drive unit
151 blade
152 piercing means
153 sealing element
154 flow passage

The invention claimed is:

1. Method of preparing an original sample of biological origin with a view to detecting at least one of the components contained in it, whereby the original sample is enclosed in a first container and at least a part of this original sample is transferred from the first container into at least one reaction container via a piercing means, a reagent or reagent mixture being placed beforehand in at least one of the reaction containers in order to prepare the original sample and the component to be detected, wherein in order to transfer at least a part of the original sample, two respective containers are connected to one another in a closed, airtight system until the component(s) to be detected has (have) been rendered stable by reacting it (them) with a reagent or reagent mixture at room temperature and when the containers are subsequently separated, the piercing means remains on the first container.

2. Method as claimed in claim 1, wherein the reagent or reagent mixture is selected from a group consisting of a lysing buffer for cells, such as blood cells for example, a stabilising buffer for nucleic acids and proteins, a releasing buffer, a preserving buffer and the solid salts of these buffers.

3. Method as claimed in claim 1, wherein, in order to separate the component(s) to be detected, a purification device with a matrix enclosed in it is connected to a reaction container and it, together with the purification device, is transferred to another container or the other container is connected to the purification device, and the reaction mixture is transferred through the matrix to the other container under the effect of a force so that the component(s) to be detected is (are) retained by the matrix.

4. Method as claimed in claim 3, wherein once the component(s) to be detected has (have) been separated from the reaction mixture, a washing container containing a washing fluid for the component(s) is attached to the purification device instead of the reaction container, and the washing fluid is transferred through the matrix into the other container under the effect of a force.

5. Method as claimed in claim 3, wherein the component(s) to be detected is (are) eluted from the matrix into another container with the aid of an eluting agent from an elution container connected in the place of the reaction container or washing fluid container.

6. Method as claimed in claim 3, wherein the active force is a force generated by vacuum pressure or a pressure above atmospheric pressure and/or centrifugal force.

* * * * *